(12) United States Patent
Shimano et al.

(10) Patent No.: US 9,394,585 B2
(45) Date of Patent: Jul. 19, 2016

(54) METHOD FOR RECOVERING ACTIVE MATERIAL FROM WASTE BATTERY MATERIAL

(75) Inventors: Satoshi Shimano, Tsukuba (JP); Shingo Matsumoto, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 167 days.

(21) Appl. No.: 13/985,003

(22) PCT Filed: Feb. 13, 2012

(86) PCT No.: PCT/JP2012/053304
§ 371 (c)(1),
(2), (4) Date: Aug. 12, 2013

(87) PCT Pub. No.: WO2012/111630
PCT Pub. Date: Aug. 23, 2012

(65) Prior Publication Data
US 2013/0323142 A1 Dec. 5, 2013

(30) Foreign Application Priority Data

Feb. 15, 2011 (JP) ................................. 2011-030147

(51) Int. Cl.
*C22B 47/00* (2006.01)
*H01M 4/04* (2006.01)
*H01M 4/1391* (2010.01)
(Continued)

(52) U.S. Cl.
CPC .............. *C22B 47/00* (2013.01); *H01M 4/0471* (2013.01); *H01M 4/1391* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS 6,511,639 B1  1/2003  Schmidt et al.
6,524,737 B1  2/2003  Tanii et al.
(Continued)

FOREIGN PATENT DOCUMENTS

JP         04249862  A  *  9/1992
JP         10-008150 A      1/1998
(Continued)

OTHER PUBLICATIONS

Communication dated Apr. 30, 2015, issued by the State Intellectual Property Office of People's Republic of China in corresponding Chinese Application No. 201280008981.3.
(Continued)

*Primary Examiner* — Melissa Swain
(74) *Attorney, Agent, or Firm* — Sughrue Mion, PLLC

(57) ABSTRACT

Method of recovering active material from waste battery materials comprises: (1) an electrode material mixture recovery step of separating an electrode from the waste battery material to recover an electrode material mixture including the active material, a conductive material, and a binder from the electrode; (2) an activation agent mixing step of mixing an activation agent including one or more alkali metal compounds with the recovered electrode material mixture; (3) an activation step of heating the obtained mixture to a retention temperature not less than a melting start temperature of the activation agent to activate the active material included in the mixture; and (4) an active material recovery step of recovering the activated active material from a mixture obtained as a result of cooling after the activation step.

20 Claims, 3 Drawing Sheets

(51) Int. Cl.
  *H01M 4/485* (2010.01)
  *H01M 4/505* (2010.01)
  *H01M 4/525* (2010.01)
  *H01M 10/54* (2006.01)

(52) U.S. Cl.
  CPC ............ *H01M 4/525* (2013.01); *H01M 10/54* (2013.01); *Y02E 60/122* (2013.01); *Y02W 30/84* (2015.05)

(56) References Cited

U.S. PATENT DOCUMENTS

| | | |
|---|---|---|
| 2005/0070184 A1 | 3/2005 | Takeda et al. |
| 2011/0002825 A1 | 1/2011 | Yamaoka et al. |
| 2011/0147679 A1 | 6/2011 | Inukai et al. |

FOREIGN PATENT DOCUMENTS

| | | |
|---|---|---|
| JP | 2000-231941 A | 8/2000 |
| JP | 2000-348782 A | 12/2000 |
| JP | 2001-023704 A | 1/2001 |
| JP | 2003-206132 A | 7/2003 |
| JP | 2003-272720 A | 9/2003 |
| JP | 2004-349210 A | 12/2004 |
| JP | 200526088 A | 1/2005 |
| JP | 3676926 B2 | 7/2005 |
| JP | 2006-236859 A | 9/2006 |
| JP | 2010-034021 A | 2/2010 |
| JP | 2011-011961 A | 1/2011 |
| WO | 0019557 A1 | 4/2000 |

OTHER PUBLICATIONS

Communication dated Sep. 16, 2015 from the Japanese Patent Office in counterpart application No. 2012-022000.

Abstract and Machine-Generated translation of JP-A 2003-206132 to Kawasaki Heavy Industry, Ltd. published Jul. 22, 2003.

Second Office Action issued Dec. 15, 2015 in corresponding Chinese Patent Application No. 201280008981.3 with translation.

* cited by examiner

METHOD FOR RECOVERING ACTIVE MATERIAL FROM WASTE BATTERY MATERIAL

CROSS REFERENCE TO RELATED APPLICATIONS

This application is a National Stage of International Application No. PCT/JP2012/053304 filed Feb. 13, 2012, claiming priority based on Japanese Patent Application No. 2011-030147 filed Feb. 15, 2011, the contents of all of which are incorporated herein by reference in their entirety.

TECHNICAL FIELD

The present invention relates to a method for recovering an active material from a waste battery material.

BACKGROUND ART

The active materials in a battery contain rare metal components, such as cobalt, nickel, manganese, and lithium. A compound including any of the rare metal components as a main component is particularly used for the positive electrode active material of a non-aqueous electrolyte secondary battery. In order to preserve resources for such a rare metal component, there is a need for a method for recovering a rare metal component from a waste battery material of a secondary battery.

As a conventionally proposed method for recovering rare metal components from a waste battery material and reusing the same, there is a method in which an electrode composed of a current collector and an electrode material mixture, or the electrode material mixture peeled from the current collector is immersed in a solution to dissolve rare metal components to extract the rare metal components into the solution, and then, the resulting solution is filtered to remove insoluble components and the pH of the rare metal component-containing solution is adjusted, whereby rare metal hydroxides and carbonates are precipitated and recovered, resulting in the recovery of raw materials for an active material (for example, see Patent Literature 1).

The hydroxides, carbonates, and chlorides of rare metal components recovered by the method are reused again as raw materials for an active material.

However, the dissolution and precipitation of rare metal components require a solution capable of dissolving the rare metal components and additionally a chemical agent for precipitating the components. In addition, it is industrially difficult to precipitate lithium that is highly soluble in aqueous solutions. Furthermore, when pH adjustment is made by adding a chemical agent including other alkali metal elements such as sodium and potassium in order to precipitate the transition metal component, it is industrially substantially difficult to separate the alkali metal elements and lithium from each other. Therefore, isolation of lithium for recovery is substantially difficult in industrial areas.

Furthermore, since waste liquids of the used solution and chemical agent are produced, disposal thereof becomes necessary. Additionally, in order to reuse, as an active material, the raw materials of an active material recovered, it is necessary to perform, in addition to a step of recovering the raw materials of the active material from a waste battery material, a step of producing an active material from the raw materials of the active material. Accordingly, manufacturing cost and manufacturing energy are needed to produce the active material from the raw materials of the active material, thus resulting in a problem from the viewpoint of economical efficiency and energy saving.

On the other hand, there is a proposed method for recovering an active material directly from a waste battery material without going through the step of producing an active material from the raw materials of an active material.

For example, Patent Literature 2 discloses a method in which an electrode is immersed in a solvent of N-methyl-2-pyrrolidone (hereinafter may be referred to as NMP), an NMP-containing mixed solvent, or the like as a solvent serving to dissolve only a binder among an active material, a conductive material, and the binder that constitute the electrode, whereby the binder is dissolved in the solvent to separate and recover a mixture product of the active material and the conductive material from the current collector, and then, the mixture product is calcined to burn the conductive material so as to recover the active material, thereby reusing the active material as an active material of a secondary battery again.

Instead of dissolving the active material to reuse as a solution containing each constituent element, directly recovering the active material and allowing the reuse thereof do not need manufacturing cost and manufacturing energy taken to produce an active material from raw materials of the active material, since it is the direct recovery of active material, and thus is more advantageous than the conventionally proposed method for recovering raw materials of an active material from a waste battery material and producing an active material from the raw materials of the active material for reuse thereof.

However, the method of Patent Literature 2 for recovering an active material from a waste battery material for reuse thereof requires an organic solvent for immersing the electrode to dissolve the binder, as well as requires liquid waste disposal for the used organic solvent.

CITATION LIST

Patent Literature

Patent Literature 1: Japanese Patent No. 3676926
Patent Literature 2: Japanese Unexamined Patent Publication No. 2010-34021

SUMMARY OF INVENTION

Technical Problem

Under the circumstances as above, it is an object of the present invention to provide a method for recovering an active material from a waste battery material, the method comprising recovering the active material directly from the waste battery material, without requiring manufacturing cost and manufacturing energy necessary to produce an active material from raw materials of the active material and without using an organic solvent to recover the active material from the waster battery material.

Solution to Problem

The present inventors conducted extensive and intensive studies to solve the above problems and found that the following invention meets the above object, thereby accomplishing the present invention.

Specifically, the present invention relates to the following:

<1> A method from a waste battery material, the method including the following steps:

(1) an electrode material mixture recovery step of separating an electrode from the waste battery material to recover an electrode material mixture including the active material, a conductive material, and a binder from the electrode;

(2) an activation agent mixing step of mixing an activation agent including one or more alkali metal compounds with the recovered electrode material mixture;

(3) an activation step of heating the obtained mixture to a retention temperature not less than a melting start temperature of the activation agent to activate the active material included in the mixture; and (4) an active material recovery step of recovering the activated active material from a mixture obtained as a result of cooling after the activation step.

<2> The method for recovering an active material according to the <1>, in which the active material is a positive electrode active material.

<3> The method for recovering an active material according to the <2>, in which the positive electrode active material is a positive electrode active material of a non-aqueous secondary battery.

<4> The method for recovering an active material according to the <2> or <3>, in which the active material is a composite oxide including one or more elements selected from the following element group 1 and one or more elements selected from the following element group 2:

element group 1: Ni, Co, Mn, Fe, Al, and P; and element group 2: Li, Na, Ca, Sr, Ba, and Mg.

<5> The method for recovering an active material according to the <4>, in which the element selected from the group 2 is Li.

<6> The method for recovering an active material according to any one of the <1> to <5>, in which the positive electrode active material has a specific surface area of from 5 to 100 $m^2/g$.

<7> The method for recovering an active material according to any one of the <1> to <6>, in which an alkali metal element constituting the alkali metal compound included in the activation agent is/are the same as an alkali metal element constituting the active material.

<8> The method for recovering an active material according to any one of the <1> to <7>, in which at least one of the alkali metal compounds included in the activation agent is an alkali metal compound exhibiting alkaline properties when dissolved in water.

<9> The method for recovering an active material according to the <8>, in which the alkali metal compound exhibiting alkaline properties when dissolved in water is at least one selected from the group consisting of hydroxide, carbonate, hydrogen carbonate, oxide, peroxide, and superoxide of alkali metal.

<10> The method for recovering an active material according to any one of the <1> to <9>, in which the conductive material included in the electrode material mixture is a carbonaceous conductive material and at least one of the alkali metal compound(s) included in the activation agent is an alkali metal compound having oxidizability to oxidize and decompose the carbonaceous conductive material at the retention temperature of the activation step.

<11> The method for recovering an active material according to the <10>, in which the alkali metal compound having oxidizability is at least one selected from the group consisting of peroxide, superoxide, nitrate, sulfate, vanadate, and molybdate of alkali metal.

<12> The method for recovering an active material according to any one of the <1> to <11>, in which in the activation agent mixing step, the addition amount of the activation agent is from 0.001 to 100 times a weight of the active material before activation included in the electrode material mixture.

<13> The method for recovering an active material according to any one of the <1> to <12>, in which the conductive material included in the electrode material mixture consists of a carbonaceous conductive material having a specific surface area of 30 $m^2/g$ or more.

<14> The method for recovering an active material according to the <13>, in which the carbonaceous conductive material is acetylene black.

<15> The method for recovering an active material according to any one of the <1> to <14>, in which the active material recovery step comprises:

a slurrying step of adding a solvent to the mixture obtained after the activation step to form a slurry;

a solid-liquid separation step of separating the slurry into a solid phase and a liquid phase; and a drying step of drying the solid phase after the solid-liquid separation.

<16> The method for recovering an active material according to the <15>, further including a step of recovering a fluorine component from the liquid phase obtained after the solid-liquid separation.

<17> The method for recovering an active material according to the <15> or <16>, further including a step of recovering the alkali metal component from the liquid phase obtained after the solid-liquid separation.

<18> The method for recovering an active material according to any one of the <1> to <14>, in which the active material recovery step is a step of recovering an active material by evaporating other components than the active material by heating to remove the other components than the active material from the mixture obtained after the activation step.

<19> The method for recovering an active material according to the <18>, in which in the active material recovery step, a temperature for evaporating the other components than the active material is higher than the retention temperature in the activation step.

<20> The method for recovering an active material according to the <18> or <19>, further including a step of recovering a fluorine component from a solution prepared by adding a solvent to a component obtained by cooling a gas generated by the evaporation of the other components than the active material.

<21> The method for recovering an active material according to the <20>, further including a step of recovering an alkali metal component from the solution after recovering the fluorine component.

Advantageous Effects of Invention

The method of the present invention can recover an active material directly from a waste battery material without using an organic solvent. Additionally, since the method of the invention can recover the active material from the waste battery material without deactivating the active material and the active material to be recovered is subjected to activation, there can be obtained an active material having battery performance equivalent to the performance of an unused active material.

DESCRIPTION OF EMBODIMENTS

Figure 1:
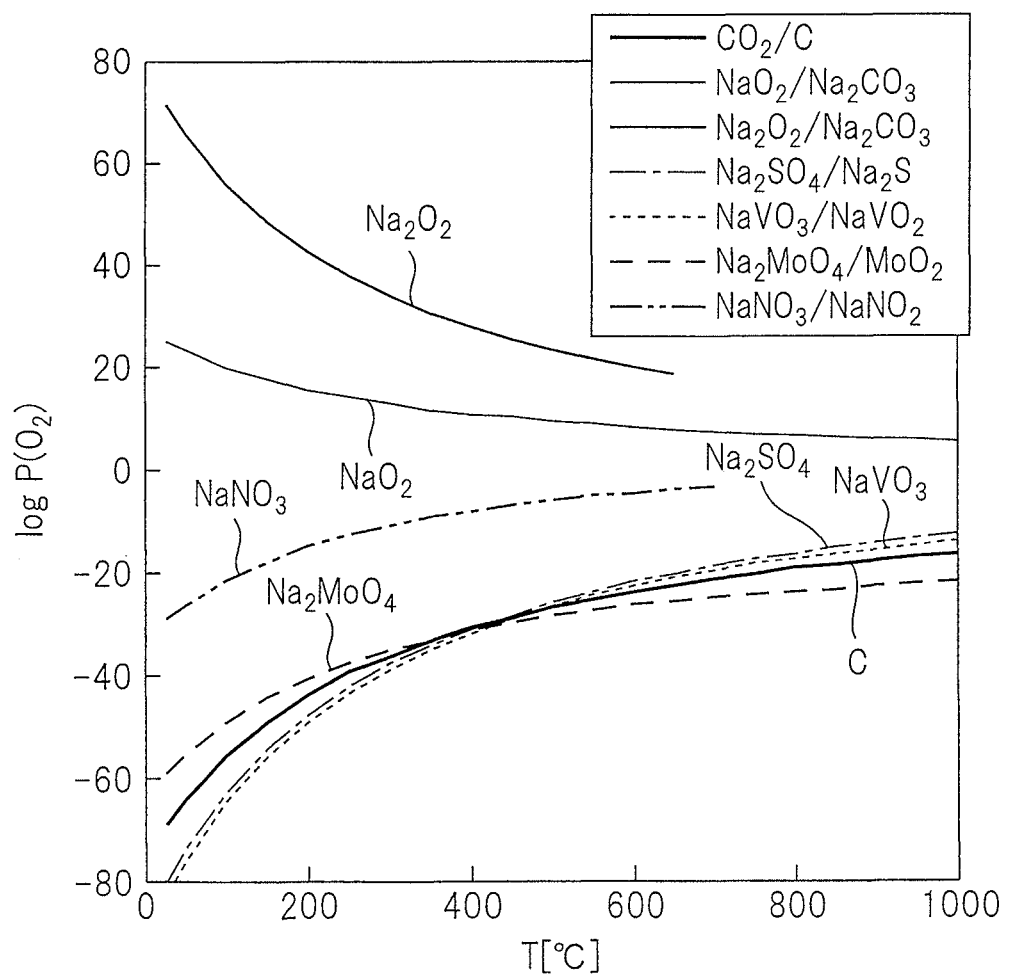
FIG. 1 is a graph depicting the temperature dependence of an oxygen potential (log $[P(O_2)]$) indicating a relationship between an oxidizability necessary to oxidize carbon and oxidizabilities of alkali metal compounds (sodium compounds).

The present invention relates to a method for recovering an active material from a waste battery material, the method including the following steps:

(1) an electrode material mixture recovery step of separating an electrode from the waste battery material to recover an electrode material mixture including the active material, a conductive material, and a binder from the electrode;

(2) an activation agent mixing step of mixing an activation agent including one or two or more alkali metal compounds with the recovered electrode material mixture;

(3) an activation step of heating the obtained mixture to a retention temperature not less than a melting start temperature of the activation agent to activate the active material included in the mixture; and (4) an active material recovery step of cooling the mixture after the activation step to recover the activated active material from the resulting mixture.

Usually, when an active material is heated together with a conductive material and a binder included in an electrode material mixture to high temperature, the active material tends to be deactivated by the effects of components such as carbon and fluorine included in the conductive material and the binder.

In step (3), when the mixture of the recovered electrode material mixture and the activation agent is heated, the activation agent included in the mixture is molten to form a liquid phase and molten alkali metal compound(s) constituting the liquid phase is/are in contact with the active material.

The molten alkali metal compound(s) provide(s) a fusion reaction field in which the activated active material is stabilized, so that even when the active material is heated together with the conductive material and the binder, deactivation of the active material can be avoidable. As a result, there can be obtained an active material that provides battery performance equal to that of an unused active material.

Furthermore, the molten alkali metal compound(s) has/have an effect of promoting the decomposition of a carbon material and a carbon-containing compound included in the conductive material and the binder.

In addition, when the electrode material mixture includes fluorine compounds derived from a binder that is a fluorine-containing high polymer compound and a fluorophosphate-containing electrolyte, heating can cause the generation of a corrosive gas such as hydrogen fluoride. However, in the step (3), even when the mixture is heated together with the activation agent to the retention temperature not less than the melting start temperature, the fluorine compounds are incorporated into the molten alkali metal compound(s) in stable forms, so that the generation of a corrosive gas such as a harmful hydrofluoric acid gas can be suppressed.

In addition, the method of the present invention can reuse an active material included in an electrode material mixture, directly as the active material itself, without decomposing into a raw material compound of the active material including a constituent element thereof. Additionally, the method of the invention does not use an organic solvent to recover an active material from a waste battery material and thus requires no disposal of organic solvent waste. Accordingly, as compared to the production of an active material from a raw material compound of the active material, cost and manufacturing energy can be reduced.

Furthermore, when recovering an active material from a waste battery material of a lithium secondary battery, the direct recovery of the active material from the waste battery material allows also the recovery of lithium, in addition to transition metals such as cobalt, nickel, and manganese, in active materials.

Hereinafter, a detailed description will be given of each step of the method for recovering an active material from a waste battery material.

Step (1): <Electrode Material Mixture Recovery Step>

The electrode material mixture recovery step as step (1) is a step in which an electrode is separated from a waste battery material to recover an electrode material mixture including an active material, a conductive material, and a binder.

In the present invention, the term "waste battery material" means a waste produced in a battery disposal process or a battery production process and includes at least an active material. Examples of the waste battery material include discarded used batteries, non-standard batteries and electrodes derived from the disassembly thereof, electrode end portions and an excess of electrode material mixture generated during a battery production process, and non-standard electrodes and electrode material mixtures not suitable to produce batteries.

In step (1), first, the electrode including an active material to be recovered is separated from the waste battery material, and next, the separated electrode material mixture is recovered.

Examples of a method for separating an electrode material mixture from an electrode composed of the electrode material mixture and a current collector include mechanically peeling the electrode material mixture from the current collector (for example, scraping off the electrode material mixture from the current collector), infiltrating a solvent into the interface between the electrode material mixture and the current collector to peel the electrode material mixture from the current collector, and dissolving the current collector into an alkaline or acidic aqueous solution to separate the electrode material mixture. Preferred is mechanical peeling of the electrode material mixture from the current collector.

In step (1), the electrode separated from the waste battery material may be a positive electrode or a negative electrode and by recovering a positive electrode material mixture or a negative electrode material mixture therefrom and then allowing the mixture to be subjected to a post-process, either a positive electrode active material or a negative electrode active material can be recovered.

The method for recovering an active material according to the present invention is suitably applied to when the active material is a positive electrode active material.

Among positive electrode active materials, preferred is a positive electrode active material of a non-aqueous secondary battery.

Hereinafter, a description will be given of the electrode material mixture to be recovered in step (1) and constituent components thereof.

<Electrode Material Mixture>

An electrode that constitutes a battery has a structure in which an electrode material mixture is applied on a metal foil, such as an aluminium foil or a copper foil, serving as a current collector. The electrode material mixture is composed of an active material, a conductive material, and a binder.

Specific examples of the active material, the conductive material, and the binging agent (hereinafter may be referred to as "pre-activation active material", "pre-activation conductive material", and "pre-activation binder", respectively) included in the electrode separated from the waste battery material include active materials, conductive materials, and binders included in electrodes and electrode material mixtures derived from the disassembly of used batteries; active materials, conductive materials, and binders included in electrodes, electrode material mixtures, and electrode material mixture pastes produced in battery production processes; and active materials, conductive materials, and binders included in non-standard batteries, electrodes, electrode material mixtures, and electrode material mixture pastes not suitable to produce batteries.

<Active Material>

Of the active materials (pre-activation active materials) included in the waste battery material, examples of the positive electrode active material include composite compounds including constituent elements, such as lithium, oxygen, fluorine, sodium, magnesium, aluminium, silicon, phosphorous, sulfur, potassium, calcium, titanium, vanadium, chromium, manganese, iron, cobalt, nickel, copper, zinc, gallium, yttrium, niobium, molybdenum, silver, indium, and tungsten.

In addition, examples of the negative electrode active material include composite compounds including constituent elements, such as lithium, oxygen, fluorine, sodium, magnesium, aluminium, silicon, phosphorous, sulfur, potassium, calcium, titanium, vanadium, chromium, manganese, iron, cobalt, nickel, copper, zinc, gallium, yttrium, niobium, molybdenum, silver, indium, and tungsten.

The active materials (the pre-activation active materials) may be each composed of a single compound or plural compounds.

Suitable examples of the positive electrode active material in the present invention include composite compounds including constituent elements, such as lithium, oxygen, sodium, sodium, magnesium, aluminium, phosphorus, sulfur, vanadium, manganese, iron, nickel, copper, cobalt, gallium, molybdenum, indium, and tungsten.

Additionally, a suitable example of the positive electrode active material of a non-aqueous secondary battery in the present invention is a composite oxide including one or more elements selected from the following element group 1 and one or more metals selected from the following element group 2:

Element group 1: Ni, Co, Mn, Fe, Al, and P; and
Element group 2: Li, Na, Ca, Sr, Ba, and Mg.

Among them, preferred is a lithium transition metal composite oxide including one or more elements selected from element group 1: Ni, Co, Mn, Fe, and P and Li selected from element group 2 or a sodium transition metal composite oxide including one or more elements selected from element group 1: Ni, Co, Mn, Fe, and P and Na selected from element group 2. Particularly preferred is a lithium transition metal composite oxide.

Specific examples of the lithium transition metal composite oxide include $LiCoO_2$, $LiNiO_2$, $Li(Ni, Co)O_2$, $Li(Ni, Mn)O_2$, $Li(Ni, Mn, Co)O_2$, $LiMn_2O_4$, $Li(Mn, Fe)_2O_4$, $Li_2MnO_3$, $Li_2NiO_3$, $Li_2(Ni, Mn)O_3$, $LiFePO_4$, and $LiMnPO_4$. These may be used alone or in combination of two or more thereof.

Specific examples of the sodium transition metal composite oxide include $NaCoO_2$, $NaNiO_2$, $Na(Ni, Co)O_2$, $Na(Ni, Mn)O_2$, $Na(Ni, Mn, Co)O_2$, $NaMn_2O_4$, $Na(Mn, Fe)_2O_4$, $NaFePO_4$, and $NaMnPO_4$. These may be used alone or in combination of two or more thereof.

The crystal structure of the composite oxide selected as an active material is not particularly limited. A preferred crystal structure thereof is a layered structure, and more preferred is a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3 m1, P31m, P3c1, P31c, R3m, R3c, P-31m, P-31c, P-3 m1, P-3c1, R-3m, R-3c, P6, $P6_1$, $P6_5$, $P6_2$, $P6_4$, $P6_3$, P-6, P6/m, $P6_3$/m, P622, $P6_122$, $P6_522$, $P6_222$, $P6_422$, $P6_322$, P6 mm, P6 cc, $P6_3$ cm, $P6_3$mc, P-6 m2, P-6c2, P-62m, P-62c, P6/mmm, P6/mcc, $P6_3$/mcm, and $P6_3$/mmc.

The monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Still more preferably, the crystal structure of the composite oxide belongs to a space group of R-3m included in the hexagonal crystal structure or C2/m included in the monoclinic crystal structure.

The crystal structure of the pre-activation active material is identified from an X-ray powder diffraction pattern obtained by X-ray powder diffraction measurement using Cu K-α radiation as a radiation source.

The active material to be recovered in the present invention has a specific surface area of usually 0.01 to 200 $m^2$/g. The method of the present invention can be applied, preferably, to an active material having a specific surface area of from 5 to 100 $m^2$/g. The specific surface area is a BET specific surface area using nitrogen gas.

The particle diameter of the active material to be recovered in the present invention is not particularly limited. Usually, the particle diameter of a pre-activation active material included in a waste battery material is approximately from 0.001 to 100 μm. The particle diameter of primary particles of the pre-activation active material can be measured with an electron micrograph.

<Conductive Material>

Examples of the conductive material (the pre-activation conductive material) included in a waste battery material include metal-based conductive materials such as metal particles and carbonaceous conductive materials made of carbon materials, and usually the conductive material is a carbonaceous conductive material.

Specific examples of the carbonaceous conductive material include graphite powder, carbon black (for example, acetylene black) and fibrous carbon materials (for example, graphitized carbon fiber and carbon nanotube).

The carbonaceous conductive material may be composed of a single carbon material or plural carbon materials.

In addition, the carbon material used as the carbonaceous conductive material has a specific surface area of usually from 0.1 to 500 $m^2$/g. From the viewpoint of increasing the rate of oxidation of the carbonaceous conductive material and performing the oxidation at lower temperature, it is preferable for the method of the present invention that the specific surface area of the carbonaceous conductive material is 30 $m^2$/g or more.

By using an activation agent including an alkali metal compound(s) having oxidizability as described below, the rate of oxidation of the carbonaceous conductive material can be increased. Additionally, even a carbon material having a small specific surface area can be subjected to oxidation.

<Binder>

Examples of the binder (the pre-activation binder) included in a waste battery material include thermoplastic resin, specifically fluoro resins such as polyvinylidene difluoride (hereinafter may be referred to as PVdF), polytetrafluoroethylene (hereinafter may be referred to as PTFE), a tetrafluoroethylene-hexafluoropropylene-vinylidene fluoride based copolymer, a hexafluoropropylene-vinylidene fluoride based copolymer, and a tetrafluoroethylene-perfluoro vinylether based copolymer; polyolefin resins such as polyethylene and polypropylene; and a styrene butadiene copolymer (hereinafter may be referred to as SBR). Two or more of these compounds may be mixed for use.

While blending amounts of the active material, the conductive material, and the binder in the electrode material mixture are not necessarily determined, the blending amounts of the binder is usually approximately from 0.5 to 30 parts by weight, and preferably approximately from 2 to 30 parts by weight, with respect to 100 parts by weight of the positive electrode active material. The blending amounts of the conductive material is usually approximately from 1 to 50 parts by weight, and preferably approximately from 1 to 30 parts by weight, with respect to 100 parts by weight of the positive electrode active material, and the blending amounts of solvent is usually approximately from 50 to 500 parts by weight, and preferably approximately from 100 to 200 parts by weight, with respect to 100 parts by weight of the positive electrode active material.

Step (2): <Activation Agent Mixing Step>

Step (2) is a step in which the activation agent including one or two or more alkali metal compounds is mixed with the electrode material mixture recovered in step (1).

Mixing of the electrode material mixture recovered in step (1) with the activation agent may be either dry mixing or wet mixing, or alternatively may be a combination thereof, and the order of mixing them is not particularly limited.

The mixing is preferably performed by going through a step of pulverizing and mixing by a mixer equipped with a mixing medium such as a ball, whereby mixing efficiency can be improved.

In terms of easier and simpler mixability, dry mixing is preferable. There can be used in dry mixing, a V type mixer, a W type mixer, a ribbon mixer, a drum mixer, a powder mixer equipped with an impeller thereinside, a ball mill, a vibration mill, or a combination of any thereof.

As a suitable powder mixer, a specific example of the powder mixer equipped with an impeller thereinside is LODIGE MIXER (manufactured by Matsubo Corporation) manufactured by Matsubo Corporation.

Hereinafter, a detailed description will be given of the activation agent used in the present step.

<Activation Agent>

The activation agent includes one or two or more alkali metal compounds.

The alkali metal compound(s) is/are in contact with the active material to allow activation of the active material. Particularly, when an alkali metal compound(s) in an activation agent including a molten part is/are in contact with the active material, the effect of activating the active material is increased.

Particularly, it is preferable that alkali metal element(s) constituting the alkali metal compound(s) included in the activation agent be the same as an alkali metal element(s) constituting the active material, in order to further increase the activation effect. For example, when lithium is included as the alkali metal element(s) constituting the active material, the alkali metal element(s) constituting the alkali metal compounds(s) included in the activation agent is preferably lithium.

In addition, the contact of the molten activation agent including an alkali metal compound(s) with the carbonaceous conductive material is effective in increasing the oxidation rate of the carbonaceous conductive material.

Furthermore, the contact of the molten activation agent including an alkali metal compound(s) with fluorine-containing compounds derived from the binder and electrolyte serves to stabilize the fluorine components as alkali metal fluorides and thereby prevent the generation of a corrosive gas such as hydrogen fluoride. It is desirable to prevent the generation of hydrogen fluoride also because it deactivates the active material.

The percentage of the alkali metal compound(s) in the activation agent is usually 50% by weight or more, and preferably 70% by weight or more, with respect to the total weight of the activation agent.

Regarding the addition amount of the activation agent in the pre-activation mixture, the percentage of the activation agent in the mixture is preferably from 0.001 to 100 times a weight of the pre-activation active material, and more preferably from 0.05 to 1 time the weight thereof.

Appropriately controlling the percentage of the activation agent in the pre-activation mixture can reduce cost necessary to recover the active material from the waste battery material, can increase the rate of oxidation and decomposition of the carbonaceous conductive material and the binder, can improve the effect of preventing the generation of a corrosive gas in the activation step, and can further increase electrode characteristics of the obtained active material.

The activation agent may include other compounds than alkali metal compound(s).

For example, there may be listed alkali earth metal compounds including alkali metal elements such as magnesium, calcium, and barium. The alkali earth metal compound(s) may be included together with alkali metal compound(s) in the activation agent in order to control the melting start temperature of the activation agent.

In addition, a content(s) of other compound(s) than alkali metal compound(s) included in the activation agent is/are selected in a range not significantly suppressing the effects derived from the molten alkali metal compound(s) described above, and usually less than 50% by weight with respect to the total weight of the activation agent.

Examples of the alkali metal compound(s) that constitute(s) the activation agent include hydroxide, borate, carbonate, oxide, peroxide, superoxide, nitrate, phosphate, sulfate, chloride, vanadate, oxalate, molybdate, and tungstate of alkali metal. These may be used alone or in combination of plural ones thereof, as the component(s) of the activation agent.

The alkali metal element(s) constituting the alkali metal compound(s) can be any as long as the element(s) is/are an alkali metal element(s). Preferred are lithium, sodium, and potassium. When two or more alkali metal compounds are included as the components of the activation agent, the compounds may be alkali metal compounds including different alkali metal elements.

Specific examples of preferable alkali metal compounds include hydroxides such as LiOH, NaOH, KOH, RbOH, and CsOH;
borates such as $LiBO_2$, $NaBO_2$, $KBO_2$, $RbBO_2$, and $CsBO_2$;
carbonates such as $Li_2CO_3$, $Na_2CO_3$, $K_2CO_3$, $RbCO_3$, and $CsCO_3$;
oxides such as $Li_2O$, $Na_2O$, $K_2O$, $Rb_2O$, and $Cs_2O$;
peroxides such as $Li_2O_2$, $Na_2O_2$, $K_2O_2$, $Rb_2O_2$, and $CS_2O_2$;
superoxides such as $LiO_2$, $NaO_2$, $KO_2$, $RbO_2$, and $CsO_2$:
nitrates such as $LiNO_3$, $NaNO_3$, $KNO_3$, $RbNO_3$, and $CsNO_3$;
phosphates such as $Li_3PO_4$, $Na_3PO_4$, $K_3PO_4$, $Rb_3PO_4$, and $Cs_3PO_4$;
sulfates such as $Li_2SO_4$, $Na_2SO_4$, $K_2SO_4$, $Rb_2SO_4$, and $Cs_2SO_4$;
chlorides such as LiCl, NaCl, KCl, RbCl, and CsCl;
bromides such as LiBr, NaBr, KBr, RbBr, and CsBr;
vanadates such as $LiVO_3$, $NaVO_3$, $KVO_3$, $RbVO_3$, and $CsVO_3$;
molybdates such as $Li_2MoO_4$, $Na_2MoO_4$, $K_2MoO_4$, $Rb_2MoO_4$ and $CsMoO_4$; and
tungstates such as $Li_2WO_4$, $Na_2WO_4$, $K_2WO_4$, $Rb_2WO_4$, and $CsWO_4$.

Among the compounds above, particularly when the active material is a Li composite oxide, preferred are lithium compounds, and more preferred are LiOH, $LiBO_2$, $Li_2CO_3$, $Li_2O$, $Li_2O_2$, $LiO_2$, $LiNO_3$, $Li_3PO_4$, $Li_2SO_4$, LiCl, $LiVO_3$, LiBr, $Li_2MoO_4$, and $Li_2WO_4$.

In addition, particularly when the active material is a Na composite oxide, preferred are sodium compounds and more preferred are NaOH, $NaBO_2$, $Na_2CO_3$, $Na_2O$, $Na_2O_2$, $NaO_2$, $NaNO_3$, $Na_3PO_4$, $Na_2SO_4$, NaCl, $NaVO_3$, NaBr, $Na_2MoO_4$, and $Na_2WO_4$.

The activation agent is preferably an activation agent in which at least one alkali metal compound included in the agent is an alkali metal compound exhibiting alkaline properties when dissolved in water (hereinafter, the activation agent may be referred to as "alkali activation agent"). The term "alkali activation agent" means an activation agent in which a solution of the compound dissolved in pure water has a pH larger than 7.

In the present invention, using the alkali activation agent is particularly effective in improving the effect of preventing the generation of a corrosive gas in the activation step (3), can further improve the electrode characteristics of the obtained active material, and additionally can increase the treatment rate of the carbonaceous conductive material and the binder.

Examples of the alkali activation agent include activation agents including hydroxide, carbonate, oxide, peroxide, and superoxide of alkali metal.

Preferred are activation agents including hydroxide, carbonate, oxide, peroxide, and superoxide of alkali metal. These may be used alone or in combination of two or more thereof.

Specific examples thereof include LiOH, NaOH, KOH, RbOH, CsOH; $Li_2CO_3$, $Na_2CO_3$, $K_2CO_3$, $RbCO_3$, $CsCO_3$; $Li_2O$, $Na_2O$, $K_2O$, $Rb_2O$, $Cs_2O$; $Li_2O_2$, $Na_2O_2$, $K_2O_2$, $Rb_2O_2$, $Cs_2O_2$; and $LiO_2$. $NaO_2$, $KO_2$, $RbO_2$, $CSO_2$.

In addition, when the conductive material included in the recovered electrode material mixture is a carbonaceous conductive material, preferred is an activation agent including an alkali metal compound(s) in which at least one alkali metal compound has oxidizability to oxidize and decompose the carbonaceous conductive material at the retention temperature of the activation step (hereinafter, the activation agent may be referred to as "activation agent having oxidizability").

Using such an activation agent having oxidizability is particularly effective in promoting the oxidation of the conductive material as a carbon material into carbon dioxide and promoting the oxidation of the binder as a hydrocarbon material to carbon dioxide and water vapor, can further improve the electrode characteristics of the obtained active material, and additionally can improve the effect of preventing the generation of a corrosive gas in the activation step.

Examples of alkali metal compounds having oxidizability necessary to oxidize the carbonaceous conductive material and hydrocarbon to carbon dioxide and water vapor include peroxide, superoxide, nitrate, sulfate, vanadate, and molybdate of alkali metal. These may be used alone or in combination of two or more thereof.

Specific examples thereof include $Li_2O_2$, $Na_2O_2$, $K_2O_2$. $Rb_2O_2$, $Cs_2O_2$; $LiO_2$, $NaO_2$, $KO_2$, $RbO_2$, $CSO_2$; $LiNO_3$, $NaNO_3$, $KNO_3$, $RbNO_3$, $CsNO_3$; $Li_2SO_4$, $Na_2SO_4$, $K_2SO_4$, $Rb_2SO_4$, $Cs_2SO_4$; $LiVO_3$, $NaVO_3$, $KVO_3$, $RbVO_3$, $CsVO_3$; $Li_2MoO_4$, $Na_2MoO_4$, $K_2MoO_4$, $Rb_2MoO_4$, and $CsMoO_4$.

The oxidizability to oxidize the conductive material as a carbon material to carbon dioxide and the oxidizability of the activation agent can be estimated using oxygen potential (log $[P(O_2)]$).

A theoretical description of the relationship therebetween will be provided below.

(i) Oxidizability Necessary to Oxidize Conductive Material

Oxidizability necessary to oxidize carbon to carbon dioxide will be now described. The equilibrium for oxidation of carbon to carbon dioxide is given as follows:

$$CO_2 = C + O_2 \qquad \text{equilibrium (a)}$$

An equilibrium constant ($K_{eq(a)}$) of equilibrium (a) has the following equation relationship (1):

$$K_{eq(a)} = \frac{1}{P(CO_2)} \cdot P(O_2) \qquad \text{equation (1)}$$

In addition, the oxygen potential (log $[P(O_2)]$) of equilibrium (a) will be given as follows:

$$\log [P(O_2)] = \log [K_{eq(a)}] + \log [P(CO_2)] \qquad \text{equation (2)}$$

The first term log $[K_{eq(a)}]$ of the right side of equation (2) represents an oxygen potential specific to an oxidation-reduction system, and the second term log $[P(CO_2)]$ of the right side thereof represents a change in the oxygen potential due to the concentration of a substance associated with the oxidation-reduction system.

In a comparison between the oxygen potentials (log $[P(O_2)]$) of various oxidation-reduction systems, the first term log $[K_{eq(a)}]$ of the right side changes more greatly than the second term log $[P(CO_2)]$ of the right side and therefore is significantly influential to the change of oxygen potential (log $[P(O_2)]$). Thus, the oxygen potential (log $[P(O_2)]$) of equilibrium (a) is represented only by the first term log $[K_{eq(a)}]$ of the right side.

In other words, the oxygen potential (log $[P(O_2)]$) of equilibrium (a) is given by equation (3):

$$\log [P(O_2)] = \log [K_{eq(a)}] \qquad \text{equation (3)}$$

log $[K_{eq(a)}]$ is calculated by a reaction free energy change $\Delta rG_T°$ [J/mol] at a prescribed temperature T[° C.].

$$\log [K_{eq(a)}] = \frac{-\Delta rG_T°(CO_2/C)}{R \times (T + 273.15)} \qquad \text{equation (4)}$$

R represents a gas constant (8.314 [J/(K/mol)]).

The free energy change $\Delta rG_T°$ [J/mol] is calculated by a free energy of formation $\Delta fG_T°$ at a prescribed temperature of a substance associated with reaction. In equilibrium (a), it is calculated as follows:

$$\Delta rG_T°(eq(a)) = \Delta fG_T°(C) + \Delta fG_T°(O_2) - \Delta fG_T°(CO_2) \qquad \text{equation (5)}$$

In equation (5), the free energy of formation $\Delta fG_T°$ of each substance can be found in a thermodynamic database. Additionally, the $\Delta fG_T°$ can be calculated by thermodynamic calculation software. As the thermodynamic database and thermodynamic calculation software, for example, MALT 2 (copyright holder: Japan Society of calorimetry and Thermal Analysis; manufacturer: Kagaku Gijutsu-Sha Co., Ltd.) can be used.

(ii) Oxidizability of Addition Agent

As a calculation example of the oxidizability of an addition agent, the oxidizability of an addition agent including $Na_2SO_4$ as an alkali metal compound will be given below.

In the addition agent including $Na_2SO_4$ as an alkali metal compound, the oxidation-reduction equilibrium of $Na_2SO_4/Na_2S$ represented by equilibrium (b) occurs.

$$0.5Na_2SO_4 = 0.5Na_2S + O_2 \qquad \text{equilibrium (b)}$$

An equilibrium constant ($K_{eq(b)}$) of equilibrium (b) has the following relationship:

$$K_{eq(b)} = \frac{[Na_2S]^{0.5}}{[Na_2SO_4]^{0.5}} \cdot P(O_2) \qquad \text{equation (6)}$$

The oxygen potential (log [P(O$_2$)]) of $Na_2SO_4/Na_2S$ is given as follows:

$$\log[P(O_2)] = \log[K_{eq(b)}] + \log\left(\frac{[Na_2SO_4]^{0.5}}{[Na_2S]^{0.5}}\right) \qquad \text{equation (7)}$$

The first term log [$K_{eq(b)}$] of the right side of equation (7), represents an oxygen potential (log [P(O$_2$)]) specific to an oxidation-reduction system, and the second term log ([Na$_2$SO$_4$]$^{0.5}$/[Na$_2$S]$^{0.5}$) of the right side thereof represents a change in the oxygen potential (log [P(O$_2$)]) due to the concentration of a substance associated with the oxidation-reduction system.

In a comparison between the oxygen potentials (log [P(O$_2$)]) of various oxidation-reduction systems, the first term log [$K_{eq(b)}$] of the right side changes more greatly than the second term log([Na$_2$SO$_4$]$^{0.5}$/[Na$_2$S]$^{0.5}$) of the right side and therefore is significantly influential to change in the oxygen potential (log [P(O$_2$)]). Thus, the oxygen potential (log [P(O$_2$)]) of the oxidation-reduction equilibrium of $Na_2SO_4/Na_2S$ is represented only by the first term log [$K_{eq(b)}$] of the right side.

In other words, the oxygen potential (log [P(O$_2$)]) of $Na_2SO_4/Na_2S$ is given by equation (8):

$$\log [P(O_2)] = \log [K(Na_2SO_4/Na_2S)] \qquad \text{equation (8)}$$

log [K(Na$_2$SO$_4$/Na$_2$S)] is calculated by a reaction free energy change $\Delta rG_T°$ [J/mol] at a prescribed temperature T[° C.].

$$\log[K_{eq(b)}] = \frac{-\Delta rG_T°(Na_2SO_4/Na_2S)}{R \times (T + 273.15)} \qquad \text{equation (9)}$$

R represents the gas constant (8.314 [J/(K/mol)]).

$$\Delta rG_T°(eq(b)) = 0.5\Delta fG_T°(Na_2S) + \Delta fG_T°(O_2) - 0.5\Delta fG_T°(Na_2SO_4) \qquad \text{equation (10)}$$

log [$K_{eq(b)}$] is calculated, for example, using the thermodynamic database software MALT 2.

As a calculation example of the oxidizability of an addition agent, the oxidizability of an addition agent including $Na_2O_2$ as an alkali metal compound is given below.

In the addition agent including $Na_2O_2$ as an alkali metal compound, the oxidation-reduction equilibrium of $Na_2O_2/Na_2CO_3$ represented by equilibrium (c) occurs.

$$2Na_2O_2 + 2CO_2 = 2Na_2CO_3 + O_2 \qquad \text{equilibrium (c)}$$

An equilibrium constant ($K_{eq(c)}$) of equilibrium (c) has the following relationship:

$$K_{eq(c)} = \frac{[Na_2CO_3]^2}{[Na_2O_2]^2 \cdot P(CO_2)^2} \cdot P(O_2) \qquad \text{equation (11)}$$

The oxygen potential (log [P(O$_2$)]) of $Na_2O_2/Na_2CO_3$ is given as follows:

$$\log[P(O_2)] = \log[K_{eq(c)}] + 2\log[P(CO_2)] + \log\left(\frac{[Na_2O_2]^2}{[Na_2CO_3]^2}\right) \qquad \text{equation (12)}$$

The first term log [$K_{eq(c)}$] of the right side of equation (12) represents an oxygen potential (log [P(O$_2$)]) specific to an oxidation-reduction system, and the second and the third terms 2 log [P(CO$_2$)]+log([Na$_2$O$_2$]$^2$/[Na$_2$CO$_3$]$^2$) of the right side thereof represents a change in the oxygen potential (log [P(O$_2$)]) due to the concentration of a substance associated with the oxidation-reduction system.

In a comparison between the oxygen potentials (log [P(O$_2$)]) of various oxidation-reduction systems, the first term log [$K_{eq(c)}$] of the right side changes more greatly than the second and the third terms 2 log [P(CO$_2$)]+ log([Na$_2$O$_2$]$^2$/[Na$_2$CO$_3$]$^2$) of the right side and therefore is significantly influential to change in the oxygen potential (log [P(O$_2$)]). Thus, the oxygen potential (log [P(O$_2$)]) of the oxidation-reduction equilibrium of $Na_2O_2/Na_2CO_3$ is represented only by the first term log [$K_{eq(c)}$] of the right side in equation (12).

In other words, the oxygen potential (log [P(O$_2$)]) of $Na_2O_2/Na_2CO_3$ is given by equation (13):

$$\log [P(O_2)] = \log [K(Na_2O_2/Na_2CO_3)] \qquad \text{equation (13)}$$

log [K(Na$_2$O$_2$/Na$_2$CO$_3$)] is calculated by a reaction free energy change $\Delta rG_T°$ [J/mol] at a prescribed temperature T[° C.].

$$\log[K_{eq(c)}] = \frac{-\Delta rG_T°(Na_2O_2/Na_2CO_3)}{R \times (T + 273.15)} \qquad \text{equation (14)}$$

R represents the gas constant (8.314 [J/(K/mol)]).

$$2Na_2O_2 + 2CO_2 = 2Na_2CO_3 + O_2 \qquad \text{equilibrium (c)}$$

$$\Delta rG_T°(eq(c)) = 2\Delta fG_T°(Na_2CO_3) + \Delta fG_T°(O_2) - 2\Delta fG_T°(Na_2O_2) - 2\Delta fG_T°(CO_2) \qquad \text{equation (15)}$$

log [$K_{eq(c)}$] is calculated, for example, using the thermodynamic database software MALT 2.

Figure 2:
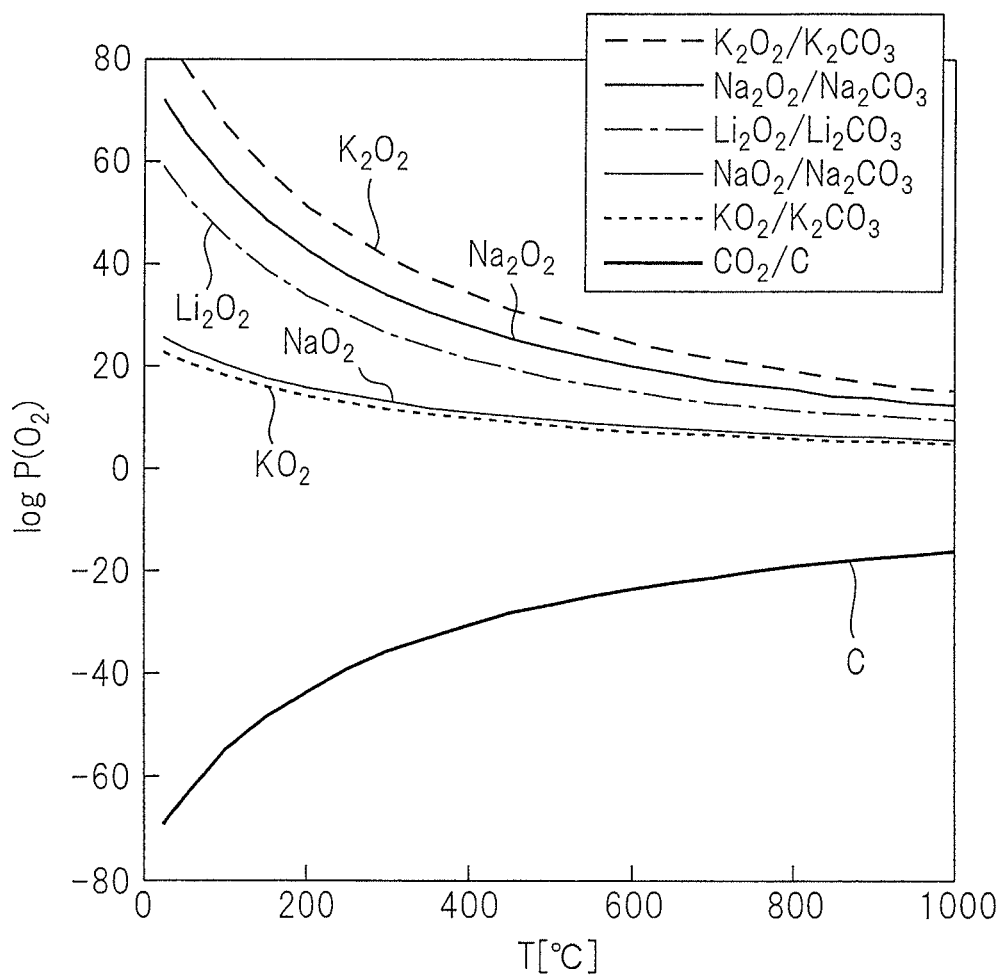
FIG. 2 is a graph depicting the temperature dependence of an oxygen potential (log $[P(O_2)]$) indicating a relationship between the oxidizability necessary to oxidize carbon and oxidizabilities of alkali metal compounds (peroxides and superoxides).
Figure 3:
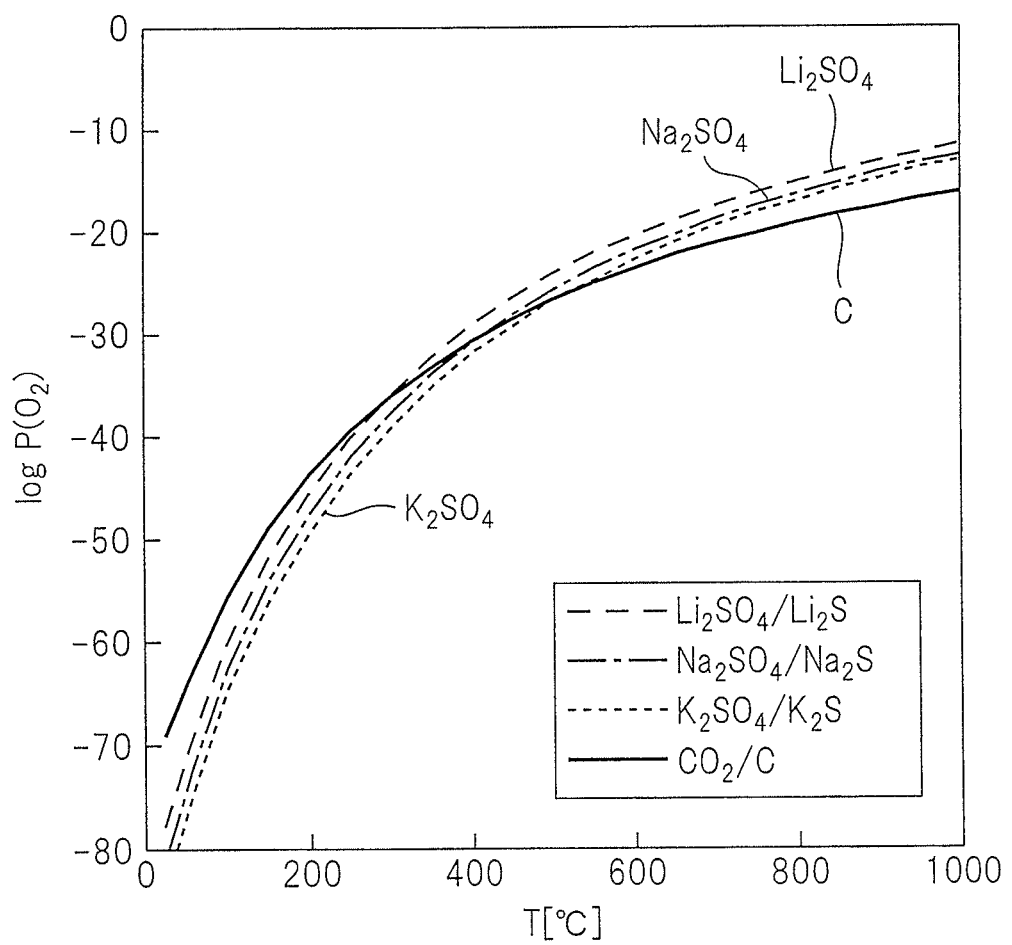
FIG. 3 is a graph depicting the temperature dependence of an oxygen potential (log $[P(O_2)]$) indicating a relationship between the oxidizability necessary to oxidize carbon and oxidizabilities of alkali metal compounds (sulfates).

The oxidizability necessary to oxidize carbon and hydrocarbon to carbon dioxide and water vapor and oxidizabilities of various alkali metal compounds were represented by oxygen potentials (log $[P(O_2)]$), and temperature dependences thereof were indicated in FIGS. 1, 2, and 3. The oxidizabilities of carbon and hydrocarbon at the respective temperatures are indicated by a curve of the carbon (C). As depicted in the graphs, when the oxygen potential (log $[P(O_2)]$) is higher than the curve at the respective temperatures, the compound has the oxidizability necessary to oxidize carbon and hydrocarbon to carbon dioxide and water vapor.

In FIG. 1, as alkali metal compounds having the oxidizability necessary to oxidize carbon and hydrocarbon to carbon dioxide and water vapor, depicted are sodium peroxide ($Na_2O_2$), sodium superoxide ($NaO_2$), sodium nitrate ($NaNO_3$), sodium molybdate ($Na_2MoO_4$), sodium sulfate ($Na_2SO_4$), and sodium vanadate ($NaVO_3$). Oxygen potentials (log $[P(O_2)]$) indicating the oxidizabilities of these alkali metal compounds have a higher temperature region than the oxygen potential (log $[P(O_2)]$) indicating the oxidizability necessary to oxidize carbon and hydrocarbon to carbon dioxide and water vapor.

In other words, sodium peroxide, sodium superoxide, sodium nitrate, sodium molybdate, sodium sulfate, and sodium vanadate have oxidizability to oxidize carbon to carbon dioxide.

In FIG. 2, as alkali metal compounds having the oxidizability necessary to oxidize carbon and hydrocarbon to carbon dioxide and water vapor, depicted are lithium peroxide ($Li_2O_2$), sodium peroxide ($Na_2O_2$), sodium superoxide ($NaO_2$), potassium peroxide ($K_2O_2$), and sodium superoxide ($KO_2$). Oxygen potentials (log $[P(O_2)]$) indicating the oxidizabilities of these alkali metal compounds have a higher temperature region than the oxygen potential (log $[P(O_2)]$) indicating the oxidizability necessary to oxidize carbon and hydrocarbon to carbon dioxide and water vapor.

In other words, the peroxides and superperoxides of the alkali metals have oxidizability to oxidize carbon to carbon dioxide.

In FIG. 3, as alkali metal compounds having the oxidizability necessary to oxidize carbon and hydrocarbon to carbon dioxide and water vapor, depicted are lithium sulfate ($Na_2SO_4$), sodium sulfate ($Na_2SO_4$), and potassium sulfate ($Na_2SO_4$). Oxygen potentials (log $[P(O_2)]$) indicating the oxidizabilities of these alkali metal compounds have a higher temperature region than the oxygen potential (log $[P(O_2)]$) indicating the oxidizability necessary to oxidize carbon and hydrocarbon to carbon dioxide and water vapor.

In other words, the sulfates of the alkali metals have oxidizability to oxidize carbon to carbon dioxide.

Step (3): <Activation Step>

Next, step (3) will be described.

Step (3): activation step is a step in which the mixture obtained in step (2) (hereinafter may be referred to as "pre-activation mixture") is heated to a retention temperature not less than the melting start temperature of the activation agent to activate an active material included in the mixture.

The term "melting start temperature (Tmp) of the activation agent" means the lowest temperature at which a part of the activation agent is in liquid phase.

In the present invention, the melting start temperature (Tmp) of the activation agent is a value determined by differential thermal analysis (DTA). Specifically, from differential thermal analysis (DTA, analysis condition: temperature increase rate 10° C./min) of 5 mg of the above mixture, a temperature at which the DTA signal exhibits an endothermic peak is defined as a melting start temperature (Tmp).

In step (3), as describe above, the mixture is heated to a retention temperature not less than the melting start temperature of the activation agent to be brought into contact with the activation agent in a molten state with the active material, whereby the active material in the electrode material mixture can be stabilized without being deactivated.

Additionally, by bringing the activation agent in the molten state and the active material into contact with the carbonaceous conductive material and the binder, the rate of oxidation and decomposition is improved, and by bringing the molten activation agent and the active material into contact with fluorine compounds derived from the binder and the electrolyte, the fluorine components can be stabilized as alkali metal fluorides, thereby exhibiting the effect of preventing the generation of hydrogen fluoride, which is a corrosive gas.

The retention temperature of the activation step is optimally determined according to the individual kinds and combinations of the active material, the conductive material, and the binder constituting the electrode material mixture, and the alkali metal compound(s) and other compounds included in the activation agent. Usually, the retention temperature thereof is in a range of from 100 to 1500° C.

The retention time of the activation step is optimally determined according to the individual kinds and combinations of the active material, the conductive material, and the binder constituting the electrode material mixture, and the alkali metal compound(s) and other compounds included in the activation agent. Usually, the retention time thereof is approximately from 10 minutes to 24 hours.

The atmosphere of the activation step is optimally determined according to the individual kinds and combinations of the active material, the conductive material, and the binder constituting the electrode material mixture, and the alkali metal compound(s) and other compounds included in the activation agent.

From the viewpoint of promoting the activation of the active material and promoting the oxidation of carbon derived from the carbonaceous conductive material or the like, preferred is an oxidizing atmosphere including oxygen, such as air.

Furthermore, preferably, the retention temperature is higher than a melting point of the alkali metal compound(s) included in the activation agent. By mixing more than one compound, the melting point of the alkali metal compounds may be lower than a melting point of each single compound. When the activation agent includes two or more alkali metal compounds, the eutectic point of the mixture agent is defined as the melting point.

Step (4): <Active Material Recovery Step>

Step (4): active material recovery step is a step of recovering the activated active material from a mixture (hereinafter may be referred to as "post-activation mixture") obtained by cooling after step (3): the activation step.

The post-activation mixture includes, besides the activated active material, an alkali metal component(s) derived from the activation agent, the undecomposed conductive material and the undecomposed binder, and other undecomposed matters of the waste battery material. In addition, when the waste battery material includes a fluorine component-containing electrolyte, the post-activation mixture may include the electrolyte-derived fluorine component.

Examples of a method for separating and recovering the active material from the mixture include solid-liquid separation of slurry in which a solvent such as water is added to the mixture to form a slurry and then followed by liquid-solid separation, and an evaporation separation method in which the mixture is heated to evaporate other components than the active material for separation thereof.

Hereinafter, a detailed description will be given of the solid-liquid separation of slurry and the evaporation separation method, which are suitable methods for the active material recovery step.

<Solid-Liquid Separation of Slurry>

First, regarding the solid-liquid separation of slurry, which is one of the suitable methods for the active material recovery step, each step will be described.

The active material recovery step by the solid-liquid separation of slurry includes a slurrying step of adding a solvent to the mixture obtained after the activation step to prepare a slurry, a solid-liquid separation step of separating the slurry into a solid phase and a liquid phase, and a drying step of drying the solid phase after the solid-liquid separation.

The method is suitable, particularly for recovery of a water-insoluble active material.

The slurrying step is a step of preparing a slurry by adding a solvent to the post-activation mixture.

The solvent to be used in the slurrying step is not limited as long as it is a solution capable of dissolving other components than the active material included in the post-activation mixture. The solvent is preferably water, which is an inexpensive and industrially easy-to-use solvent. In order to increase the solubility of a water-soluble component and increase the treatment rate, any other component than water may be added to adjust the pH of the slurry.

In the slurrying step, the slurry prepared is composed of a solid phase including the active material and a liquid phase including other water-soluble component(s) than the active material. The liquid phase includes an alkali metal component(s) derived from the activation agent and fluorine components derived from the pre-activation binder and the electrolyte.

The amount of the solvent added to the post-activation mixture is determined in consideration of the individual amounts of the active material and the other water-soluble component(s) than the active material included in the post-activation mixture.

The slurry prepared in the slurrying step is then subjected to the solid-liquid separation step.

The solid-liquid separation step is a step of separating the liquid phase and the solid phase constituting the slurry.

As the method for solid-liquid separation, a conventionally known method may be used, such as, filtering or centrifugation.

The drying step is a step of drying the active material obtained after the solid-liquid separation step to remove the solvent (water).

The retention temperature for drying is preferably 100° C. or higher in order to remove the solvent (water). Additionally, for sufficient removal of water, the temperature is preferably 150° C. or higher. Particularly preferred is a temperature of 250° C. or higher, since the temperature range further increases the battery characteristics of the resulting active material. The temperature in the drying step may be set constant or changed gradually or successively.

When the liquid phase in the solid-liquid separation step includes fluorine components derived from the pre-activation binder and the electrolyte, it is preferable to include a step of recovering the fluorine component in the liquid phase.

Specifically, the fluorine components can be recovered by adding a precipitant to the liquid phase obtained in the solid-liquid separation step or evaporating the solvent (water) therefrom. For example, the fluorine components can be recovered as calcium fluorides by adding a calcium ion-generating precipitant to the liquid phase. The fluorine components recovered in the fluorine recovery step can be recycled as raw materials of fluorine products.

In addition, when the liquid phase in the solid-liquid separation step includes an alkali metal component(s) derived from the activation agent, it is preferable to include a step of recovering the alkali metal component(s) in the liquid phase.

The alkali metal component(s) can be recovered by evaporating water in the liquid phase after the solid-liquid separation step or in the fluorine recovery step. The recovered alkali metal component(s) is/are reused, preferably, as an alkali metal component(s) included in the activation agent in step (2): activation mixing step.

Next, a description will be given of each step of the evaporation separation method, which is another suitable method for the active material recovery step.

The active material recovery step by the evaporation separation method is an active material recovery step including an evaporation separation step of separating other components than the active material and the active material by evaporating the other components than the active material by heating the post-activation mixture.

By using the active material recovery step by the evaporation separation operation, the active material can be recovered without bringing the active material into contact with water. Accordingly, the method is suitable for the recovery of an active material whose battery characteristics will be deteriorated due to the contact thereof with water.

The temperature for the evaporation separation step is adjusted according to the kinds of other components than the active material. The temperature therefor is preferably not less than decomposition temperatures or boiling points of the alkali metal compound(s) included in the activation agent.

The activation step and the evaporation separation step may be performed simultaneously, successively, or separately.

More preferably, sequentially after the activation step, the evaporation separation step is performed. At that time, preferably, the evaporation separation step is performed at a temperature higher than the retention temperature of the activation step. The two-stage treatment of performing the evaporation separation step by additionally heating after the activation step can increase energy efficiency, can improve the effect of preventing the generation of a corrosive gas, and can further improve the battery characteristics of the resulting active material.

In the evaporation separation method, it is preferable to include a step of recovering fluorine components derived from the pre-activation binder and the electrolyte, included in other components than the active material obtained by cooling a gas generated in the evaporation separation step.

The fluorine component recovery step in the evaporation separation method includes a step of recovering fluorine components from a solution prepared by adding a solvent to components obtained by cooling a gas generated by evaporating the other components than the active material.

Specifically, the gas generated in the evaporation separation step is collected by a demister, cooled, and then solidified, whereby the other components than the active material included in the post-activation mixture can be recovered. The recovered other components than the active material are dissolved in an aqueous solution. To the solution is added a precipitant capable of selectively precipitating fluorine components to precipitate the fluorine components, followed by solid-liquid separation by filtering or the like, resulting in the recovery of the fluorine components as solid phases.

The solvent for dissolving the other components than the active material is not limited as long as it is a solvent capable of dissolving the other components than the active material included in the post-activation mixture. The solvent is preferably water, which is inexpensive and industrially easy-to-use. pH adjustment may be made to increase the solubility of a water-soluble component and the treatment rate.

For example, use of a calcium ion-generating precipitant allows the recovery of a fluorine component as calcium fluoride. Fluorine components recovered by the fluorine component recovery operation can be recycled as raw materials of fluorine products.

Also in the evaporation separation method, it is preferable to recover an alkali metal component(s) derived from the activation agent included in the other components than the active material.

It is particularly preferable to include a step of recovering the alkali metal component(s) from the solution after the recovery of the fluorine components, although it is possible to use the method in which the gas generated in the evaporation separation step is collected by a demister, cooled, and then solidified to recover the other components than the active material, which include the activation agent-derived alkali metal component(s). Specifically, the alkali metal component(s) can be recovered by evaporating water of the liquid phase obtained after the solid-liquid separation by the fluorine component recovery operation.

The recovered alkali metal component(s) is/are utilized, preferably, as an alkali metal compound(s) of the activation agent.

"Production of Electrode Using Recovered Active Material"

By using the method for recovering an active material according to the present invention, an active material obtained from a waste battery material can be reused as in an unused active material. A mole ratio of alkali metal to transition metal in the active material is preferably equal to or larger than the mole ratio in the pre-activation active material. Increasing the ratio of alkali metal can increase the battery characteristics of the resulting active material.

Hereinafter, methods for producing an electrode material mixture and an electrode using the recovered active material will be described using examples of producing an electrode material mixture (a positive electrode material mixture) and an electrode (a positive electrode) for a non-aqueous electrolyte secondary battery.

<Positive Electrode>

An electrode (a positive electrode) is produced by supporting an electrode material mixture including an active material, a conductive material, and a binder on a current collector.

The active material can be any as long as it is an active material obtained by the method for recovering an active material from a waste battery material. An unused active material may be added according to need.

As the conductive material, a carbon material may be used. Examples of the carbon material include graphite powder, carbon black (such as acetylene black), and a fibrous carbon material. By increasing the percentage of the conductive material in the electrode, the conductivity of the electrode is increased, so that charge/discharge efficiency and rate characteristics can be improved. If the percentage of the conductive material in the electrode is too large, the bindability between the electrode material mixture and the positive electrode current collector is reduced and thereby internal resistance may be increased. Usually, the percentage of the conductive material in the electrode material mixture is from 1 to 20 parts by weight with respect to 100 parts by weight of the active material.

When using a fibrous carbon material, such as graphite, carbon fiber, or carbon nanotube, as the conductive material, the above percentage thereof can be lowered. In addition, by adding a small amount of carbon black in the electrode material mixture, the conductivity inside the electrode can be increased, thereby improving the charge/discharge efficiency and the rate characteristics.

As the binder, a thermoplastic resin is usable. Specific examples of the thermoplastic resin include fluoro resins such as polyvinylidene difluoride (PVdF), polytetrafluoroethylene (hereinafter may be referred to as PTFE), a tetrafluoroethylene-hexafluoropropylene-vinylidene fluoride based copolymer, a hexafluoropropylene-vinylidene fluoride based copolymer, and a tetrafluoroethylene-perfluoro vinylether based copolymer; and polyolefin resins such as polyethylene and polypropylene.

In addition, two or more of these compounds may be mixed together for use.

Additionally, as the binder, a fluoro resin and a polyolefin resin may be used and added such that the percentage of the fluoro resin and the percentage of the polyolefin resin, respectively, are from 1 to 10% by weight and from 0.1 to 2% by weight, respectively, in 100% by weight of the positive electrode material mixture, whereby the resulting positive electrode material mixture can have excellent bindability with the positive electrode current collector.

The current collector can be a conductive material such as aluminium, nickel, or stainless steel. In addition, in terms of processability into a thin film and low cost, aluminium (Al) is preferable.

As a method for supporting the electrode material mixture on the current collector, there may be mentioned a pressurizing and molding process or bonding of an electrode material mixture paste.

The electrode material mixture paste is produced using an active material, a conductive material, a binder, and a solvent. The electrode material mixture paste is applied on the current collector, dried, and then bonded by pressing or the like.

As the solvent, an aqueous solvent or an organic solvent can be used.

According to need, a thickener may be added to the solvent. Examples of the thickener include carboxymethyl cellulose, sodium polyacrylic acid, polyvinyl alcohol, and polyvinyl pyrrolidone.

Examples of the organic solvent include amine-based solvents such as N,N-dimethylamino propylamine and diethylene triamine; ether-base solvents such as tetrahydrofuran; ketone-based solvents such as methyl ethyl ketone; ester-based solvents such as methyl acetate; and amide-based solvents such as dimethylacetoamide and N-methyl-2-pyrrolidone.

Examples of a method for applying the electrode material mixture on the current collector include a slit die coating method, a screen coating method, a curtain coating method, a knife coating method, a gravure coating method, and a static spraying method. Using any of the methods mentioned above, a non-aqueous electrolyte secondary battery electrode can be produced.

Next, a description will be given of a method for producing a non-aqueous electrolyte secondary battery using the above electrode, by taking an example of production of a lithium secondary battery.

A separator, a negative electrode, and a positive electrode are laminated and wounded together to produce an electrode group. The electrode group is housed in a battery casing and impregnated with an electrolytic solution to produce a lithium secondary battery.

As the shape of the electrode group, for example, a section of the electrode group when cut vertically to the winding axis may have a shape such as a circle, oval, rectangle, or a rectangle with roundish corners.

In addition, examples of the shape of the battery include a paper shape, a coin shape, a cylindrical shape, and a rectangular shape.

The negative electrode is not limited as long as doping and de-doping of lithium ions can be performed at a lower potential than the positive electrode. The negative electrode may be an electrode formed by supporting a negative electrode material mixture including a negative electrode active material on a negative electrode current collector or an electrode made of a negative electrode active material alone. Examples of a material of the negative electrode active material include carbon materials, chalcogen compounds (such as oxides and sulfides), nitrides, metals, and alloys, which are materials capable of doping and de-doping lithium ions at a lower potential than the positive electrode. These negative electrode active materials may be used in combination.

<Negative Electrode>

Examples of the negative electrode active material will be given below.

Specific examples of the carbon material include graphites such as natural graphite and synthetic graphite, cokes, carbon black, pyrolytic carbons, carbon fiber, and an organic high polymer compound sintered body.

Specific examples of the oxides include silicon oxides represented by formula $SiO_x$ (in which x represents a positive real number), such as $SiO_2$ and SiO; titanium oxides represented by formula $TiO_x$ (in which x represents a positive real number), such as $TiO_2$ and TiO; vanadium oxides represented by formula $VO_x$ (in which x represents a positive real number), such as $V_2O_5$ and $VO_2$; iron oxides represented by formula $FeO_x$ (in which x represents a positive real number), such as $Fe_3O_4$, $Fe_2O_3$, and FeO; tin oxides represented by formula $SnO_x$ (in which x represents a positive real number), such as $SnO_2$ and SnO; tungsten oxides represented by formula $WO_x$ (in which x represents a positive real number), such as $WO_3$ and $WO_2$; composite metal oxides including lithium and titanium and/or vanadium, such as $Li_4Ti_5O_{12}$ and $LiVO_2$.

Specific examples of the sulfides include titanium sulfides represented by formula $TiS_x$ (in which x represents a positive real number), such as $Ti_2S_3$, $TiS_2$, and TiS; vanadium sulfides represented by formula $VS_x$ (in which x represents a positive real number), such as $V_3S_4$, $VS_2$, and VS; iron sulfides represented by formula $FeS_x$ (in which x represents a positive real number), such as $Fe_3S_4$, $FeS_2$, and FeS; molybdenum sulfides represented by formula $MoS_x$ (in which x represents a positive real number), such as $Mo_2S_3$ and $MoS_2$; tin sulfides represented by formula $SnS_x$ (in which x represents a positive real number), such as $SnS_2$ and SnS; tungsten sulfides represented by formula $WS_x$ (in which x represents a positive real number), such as $WS_2$; antimony sulfides represented by formula $SbS_x$ (in which x represents a positive real number), such as $Sb_2S_3$; and selenium sulfides represented by formula $SeS_x$ (in which x represents a positive real number), such as $Se_5S$, $SeS_2$, and SeS.

Specific examples of the nitrides include lithium-containing nitrides such as $Li_3N$ and $Li_{3-x}A_xN$ (in which A represents Ni and/or Co, and $0<x<3$).

These carbon materials, oxides, sulfides, and nitrides may be used in combination, and may be either crystalline or amorphous. In addition, these carbon materials, oxides, sulfides, and nitrides are mainly supported on the negative electrode current collector to be used as the electrode.

In addition, specific examples of the metals include lithium metals, silicon metals, and tin metals.

Additionally, examples of the alloys include lithium alloys such as Li—Al, Li—Ni, and Li—Si; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

Among the negative electrode active materials, carbon materials containing graphite as a main component, such as natural graphite and synthetic graphite are preferably used due to favorable potential flatness, low average charge/discharge potential, and good cyclability. The shapes of such carbon materials may be, for example, a thin film shape like natural graphite, a spherical shape like meso carbon microbeads, a fibrous aggregate like graphitized carbon fiber, or an aggregate of fine powder.

The negative electrode material mixture may include a binder according to need. The binder may be a thermoplastic resin, and specific examples of the thermoplastic resin include PVdF, thermoplastic polyimide, carboxymethyl cellulose, polyethylene, and polypropylene.

Examples of the negative electrode current collector include conductors such as copper, nickel, and stainless steel. Copper can be used, from the viewpoint in which copper can hardly form an alloy with lithium and can be easily processed into a thin film.

The method for supporting the negative electrode material mixture on the negative electrode current collector is the same as in the negative electrode and examples of the method include a pressurizing and molding method and bonding of a negative electrode material mixture paste.

<Separator>

The separator can be formed by using members made of materials such as polyolefin resins, e.g. polyethylene and polypropylene, fluoro resins, and nitrogen-containing aromatic polymers and having forms of porous membrane, non-woven fabric, woven fabric, etc. In addition, the separator may be formed by using two or more of the materials or by laminating any of the members. Examples of the separator include separators described in Japanese Laid-open Patent Publication No. 2000-30686 and Japanese Laid-open Patent Publication No. 1998-324758. It is desirable for the separator to be made thinner as long as mechanical strength thereof can be maintained, in terms of increasing the volume energy density of the battery to reduce the inner resistance thereof. The thickness of the separator is usually approximately from 5 to 200 μm, and preferably approximately from 5 to 40 μm.

Preferably, the separator includes a porous film of a thermoplastic resin. Usually, it is preferable for the non-aqueous electrolyte secondary battery to have a function of blocking (shutdown) excessive current flow by cutting off current when abnormal current flow occurs in a battery due to a short circuit between the positive electrode and the negative electrode or other reason. The shutdown is performed by closing micropores of the porous film in the separator when temperature inside the battery exceeds usual temperature for use. Then, after the shutdown, even if the temperature inside the battery increases up to a certain level of high temperature, it is preferable to maintain the shutdown state without causing film rupture due to the increased temperature. As such a separator, there may be mentioned a laminated film formed by laminating a heat-resistant porous layer and a porous film. By using the film as the separator, heat resistance of the secondary battery in the present invention can be further increased. The heat-resistant porous layer may be laminated on both surfaces of the porous film.

Hereinafter, a description will be given of the laminate film formed by laminating the heat-resistant porous layer and the porous film.

In the laminated film, the heat-resistant porous layer has higher heat resistance than the porous film. The heat-resistant porous layer may be formed using inorganic powder or may include a heat-resistant resin. When a heat-resistant resin is included, the heat-resistant porous layer can be formed by an easy technique, such as coating.

Examples of the heat-resistant resin include polyamide, polyimide, polyamideimide, polycarbonate, polyacetal, polysulfone, polyphenylene sulfide, polyether ketone, aromatic polyester, polyether sulfone, and polyether imide. In order to further increase heat resistance, preferred are polyamide, polyimide, polyamideimide, polyether sulfone, and polyether imide. More preferred are polyamide, polyimide, and polyamideimide. Still more preferred are nitrogen-containing aromatic polymers such as aromatic polyamides (para-oriented aromatic polyamide and meta-oriented aromatic polyamide), aromatic polyimides, and aromatic polyamideimides. Above all, preferred are aromatic polyamides, and, in terms of manufacturing, particularly preferred is para-oriented aromatic polyamide (hereinafter may be referred to as para-aramid).

In addition, as the heat-resistant resin, there may be mentioned poly-4-methylpentene-1 and a cyclic olefin-based polymer. Use of the heat-resistant resins as above can further increase the heat resistance of the laminated film, i.e., the thermal film rupture temperature of the laminated film.

The thermal film rupture temperature of the laminated film is dependent on the kind of the heat-resistant resin and selected according to the situation for use and the intended purpose for use. More specifically, the thermal film rupture temperature can be controlled to approximately 400° C. when using any of the nitrogen-containing aromatic polymers as the heat-resistant resin, to approximately 250° C. when using poly-4-methylpentene-1, and to approximately 300° C. when using a cyclic olefin-based polymer, respectively. In addition, when the heat-resistant porous layer is made of inorganic powder, the thermal film rupture temperature can be controlled to 500° C. or higher.

The para-aramid is obtained by condensation polymerization of para-oriented aromatic diamine and a para-oriented aromatic dicarboxylic halide and substantially composed of repeating units in which an amide bond is coupled to the para position or equivalent orientation position of an aromatic ring (e.g. an orientation position extending coaxially or in parallel to the opposite direction, as in 4,4'-biphenylene, 1,5-naphthalene, 2,6-naphthalene, etc).

Specific examples of the para-amide include those having a para-oriented structure or a structure equivalent to the para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and a copolymer of paraphenylene terephthalamide/2,6-dichloro paraphenylene terephthalamide.

The aromatic polyimide is preferably a wholly aromatic polyimide produced by condensation polymerization of aromatic dianhydride and diamine.

Specific examples of the dianhydride include pyromellitic dianhydride, 3,3',4,4'-diphenylsulfone tetracarboxylic dianhydride, 3,3',4,4'-benzophenone tetracarboxylic dianhydride, 2,2'-bis((3,4-dicarboxyphenyl)hexafluoropropane, and 3,3', 4,4'-biphenyltetracarboxylic dianhydride. Specific examples of the diamine include oxydianiline, para-phenylenediamine, benzophenone diamine, 3,3'-methylenedianiline, 3,3'-diaminobenzophenone, 3,3'-diaminodiphenylsulfone, and 1,5-naphthalenediamine.

Additionally, a polyimide soluble in the solvent can be suitably used. An example of such a polyimide is a condensation polymer of 3,3',4,4'-diphenylsulfone tetracarboxylic dianhydride and aromatic diamine.

Examples of the aromatic polyamide-imide include a condensation polymer of an aromatic dicarboxylic acid and aromatic diisocyanate and a condensation polymer of an aromatic dianhydride and aromatic diisocyanate.

Specific examples of the aromatic dicarboxylic acid are isophthalic acid and terephthalic acid. In addition, a specific example of the aromatic dianhydride is trimellitic anhydride.

Specific examples of the aromatic diisocyanate include 4,4'-diphenylmethane diisocyanate, 2,4-tolylene diisocyanate, 2,6-tolylene isocyanate, ortho-tri run diisocyanate, and m-xylene diisocyanate.

Additionally, in order to further increase ionic permeability, the thickness of the heat-resistant porous layer is preferably from 1 to 10 μm, more preferably from 1 to 5 μm, and particularly preferably from 1 to 4 μm. In addition, the heat-resistant porous layer has micropores with a diameter of usually 3 μm or less, and preferably 1 μm or less.

When the heat-resistant porous layer includes a heat-resistant resin, the heat-resistant porous layer may also include a filler described below.

In the laminated film, preferably, the porous film has micropores and has the shutdown function. In this case, the porous film includes a thermoplastic resin.

The micropores of the porous film have a size of usually 3 μm or less, and preferably 1 μm or less.

The porous film has a porosity of usually from 30 to 80% by volume, and preferably from 40 to 70% by volume.

In the non-aqueous electrolyte secondary battery using the porous film including a thermoplastic resin, when the temperature of the battery exceeds an usual temperature for use, the thermoplastic resin is softened to close the micropores.

As the thermoplastic resin, a resin insoluble in the electrolyte in the non-aqueous electrolyte secondary battery is selected. Specific examples of the thermoplastic resin include polyolefin resins such as polyethylene and polypropylene and thermoplastic polyurethane resins. A mixture of two or more thereof may be used. In order to soften the resin at lower temperature to shut down the micropores, it is preferable to include polyethylene.

Specific examples of the polyethylene include low density polyethylene, high density polyethylene, linear polyethylene, and ultra-high molecular weight polyethylene having a molecular weight of one million or more.

The thermoplastic resin constituting the porous film preferably includes at least an ultra-high molecular weight polyethylene, in order to further increase the puncture strength of the film.

In addition, in terms of manufacturing the porous film, it may be preferable for the thermoplastic resin to include wax made of a low molecular weight polyolefin having a weight average molecular weight of 10,000 or less.

In addition, the porous film in the laminated film has a thickness of usually from 3 to 30 μm, and preferably from 3 to 25 μm. Additionally, in the present invention, the thickness of the laminated film is usually 40 μm or less, and preferably 20 μm or less.

When the thickness of the heat-resistant porous layer is A μm and the thickness of the porous film is B μm, the value of A/B is preferably from 0.1 to 1.

When the heat-resistant porous layer includes a heat-resistant resin, the heat-resistant porous layer may include one or more fillers. The filler(s) may be selected from organic powder, inorganic powder, and a combination thereof. Particles constituting the filler(s) have an average particle diameter of preferably from 0.01 to 1 μm.

Examples of the organic powder include styrene, vinyl ketone, acrylonitrile, methyl methacrylate, ethyl methacrylate, glycidyl methacrylate, glycidyl acrylate, and methyl acrylate, respectively, alone or a copolymer of two or more thereof; fluorine-based resins such as polytetrafluoroethylene, a tetrafluoroethylene-hexafluoropropylene copolymer, a tetrafluoroethylene-ethylene copolymer, and polyvinylidene fluoride; melamine resins; urea resins; polyolefin; polymethacrylate.

The organic powder may be used alone or in combination of two or more thereof.

Among these organic powders, in terms of chemical stability, preferred is a polytetrafluoroethylene powder.

Examples of the inorganic powder include powders made of inorganic materials such as metal oxide, metal nitride, metal carbide, metal hydroxide, carbonate, and sulfate. Among them, preferred is a powder made of an inorganic material having low conductivity.

A specific example of the inorganic powder is a powder composed of alumina, silica, titanium dioxide, or calcium carbonate. The inorganic powder may be used alone or in combination of two or more thereof. Among them, preferred is an alumina powder in terms of chemical stability.

More preferably, the filler is composed of only alumina particles. Still more preferably, a part or all of the alumina particles constituting the filler are roughly spherical.

When the heat-resistant porous layer is composed of an inorganic powder, any of the exemplified inorganic powders may be used, and may be mixed with a binder for use, as needed.

When all of the particles constituting the filler are composed of alumina, the filler has a weight of usually from 5 to 95 parts by weight, and preferably from 20 to 95 parts by weight, with respect to 100 parts by weight of the total weight of the heat-resistant porous layer. More preferably, the weight of the filler is 30 to 90 parts by weight. These ranges can be appropriately determined according to the specific gravity (ies) of the material(s) of the filler.

Examples of the shape of the filler include a roughly spherical shape, a plate shape, a pillar shape, a needle shape, a whisker shape, and a fibrous shape, and particles of any shape can be used. Furthermore, in terms of being easy to form uniform pores, preferred is roughly spherical particles. As the roughly spherical particles, there may be mentioned particles having a particle aspect ratio (particle long diameter/particle short diameter) of from 1 to 1.5. The particle aspect ratio can be measured from an electron micrograph.

In order to increase ionic permeability, an air permeability of the separator according to the Gurley method is preferably from 50 to 300 seconds/100 cc, and more preferably from 50 to 200 seconds/100 cc.

In addition, the porosity of the separator is usually from 30 to 80% by volume, and preferably from 40 to 70% by volume. The separator may be a laminate of separators having different porosities.

<Electrolytic Solution and Solid Electrolyte>

In a secondary battery, the electrolytic solution is usually composed of an electrolyte and an organic solvent.

Examples of the electrolyte include perchloric acid salt containing an alkali metal cation, hexafluorophosphate salt, hexafluoride arsenic salt, hexafluoroantimonate salt, boron tetrafluoride salt, trifluoromethanesulfonate salt, trifluoromethanesulfonate of a sulfone amide compound, boron compound salt, and borate. A mixture of two or more thereof may be used.

Examples of the lithium salt include $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (in which BOB represents bis(oxalate)borate), lower aliphatic carboxylic acid lithium salt, and $LiAlCl_4$. Among them, the lithium salt to be used is at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

Additionally, in the electrolytic solution, examples of the solvent include carbonates such as propylene carbonate, ethylene carbonate, dimethyl carbonate, diethyl carbonate, ethyl methyl carbonate, 4-trifluoromethyl-1,3-dioxolane-2-on, and 1,2-di(methoxycarbonyloxy)ethane; ethers such as 1,2-dimethoxyethane, 1,3-dimethoxypropane, pentafluoropropyl methylether, 2,2,3,3-tetrafluoropropyldifluoromethylether, tetrahydrofuran, and 2-methyltetrahydrofuran; esters such as methyl formate, methyl acetate, and 7-butyrolactone; nitriles such as acetonitrile and butyronitrile; amides such as N,N-dimethylformamide and N,N-dimethylacetoamide; carbamates such as 3-methyl-2-oxazolidone; sulfur-containing compounds such as sulfolane, dimethylsulfoxide, and 1,3-propane sultone.

Alternatively, a solvent prepared by additionally introducing a fluorine substituent in any of the organic solvents may be used.

Usually, a mixture of two or more of the organic solvents is used.

Among them, preferred are mixed solvents including carbonates, and more preferred are a mixed solvent including a cyclic carbonate and a non-cyclic carbonate or a mixed solvent including a cyclic carbonate and an ether.

As the mixed solvent including a cyclic carbonate and a non-cyclic carbonate, preferred is a mixed solvent including ethylene carbonate, dimethyl carbonate, and ethyl methyl carbonate, in terms of having a wide operating temperature range, having excellent load characteristics, and being persistent even when using a graphite material such as natural graphite or synthetic graphite as the negative electrode active material.

In addition, particularly due to the effect of improving safety, it is preferable to use an electrolytic solution including an organic solvent that contains an alkali metal salt including a fluorine such as $LiPF_6$ and a fluorine substituent.

More preferred are mixed solvents including fluorine substituent-containing ethers, such as pentafluoropropyl methylether and 2,2,3,3-tetrafluoropropyl difluoromethylether, and dimethyl carbonate because of the excellent large-current discharge characteristics thereof.

A solid electrolyte may be used instead of the electrolytic solution.

Examples of the solid electrolyte usable include organic high polymer electrolytes, such as polyethylene oxide-based high polymer compounds and high polymer compounds including at least one or more of polyorganosiloxane chain or polyoxyalkylene chain. Alternatively, there may be used a so-called gel type electrolyte obtained by supporting a non-aqueous electrolytic solution on a high polymer compound.

In addition, an inorganic solid electrolyte may be used that includes a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, or $Li_2S$—$SiS_2Li_2SO_4$.

Using any of these solid electrolytes can further increase safety.

Furthermore, when the non-aqueous electrolyte secondary battery of the present invention uses a solid electrolyte, the solid electrolyte may serve as a separator. In this case, separator may not be needed.

EXAMPLES

Next, the present invention will be described in more detail with reference to Examples.

Measurement of physical properties of an active material (a pre-activation active material or an unused active material) and a charge/discharge test of a battery using the active material as a positive electrode active material were performed as follows:

(1) Composition Analysis

A sample was dissolved in hydrochloric acid and then subjected to composition analysis using inductively coupled plasma atomic emission spectrometry (hereinafter may be referred to as ICP-AES) (using SPS 3000 manufactured by SII Nano Technology Inc).

(2) X-Ray Powder Diffraction Measurement

X-ray powder diffraction measurement of the sample was performed using RINT 2500 TTR model, manufactured by Rigaku Corporation. As a radiation source for X-ray, Cu KU was used. The active material was filled in a holder for exclusive use, and the measurement was performed in a range of diffraction angle 2θ of from 10 to 90° to obtain an X-ray powder diffraction pattern.

(3) Measurement of Specific Surface Area

In a nitrogen atmosphere, 0.5 g of a sample was dried at 150° C. for 15 minutes and then subjected to BET specific surface area measurement using FlowSorb 112300 manufactured by Micromeritics Ltd. The specific surface area measured by the method was defined as the specific surface area of the active material.

(4) Measurement of Average Particle Diameter of Active Material

An amount of 0.1 g of a sample powder was added in 50 mL of 0.2 wt % sodium hexametaphosphate aqueous solution to prepare, as a sample, a dispersion solution containing the dispersed sample powder. The dispersion solution was subjected to particle size distribution measurement using MASTERSIZER-2000 (a laser diffraction particle size analyzer) manufactured by Malvern Instruments Ltd., to obtain an accumulated particle size distribution curve on a volume basis. The value of a particle diameter (D50) at 50% accumulation from the smaller particle side in the distribution was defined as an average particle diameter of the powder.

(5) Measurement of Average Primary Particle Diameter of Active Material

Sample particles were placed on a conductive sheet attached on a sample stage and subjected to SEM observation by irradiation with an electron beam with an accelerating voltage of 20 kV using JSM-5510 manufactured by JOEL Ltd. The average primary particle diameter was measured by arbitrarily extracting 50 primary particles from an image (a SEM photograph) obtained by the SEM observation, then measuring individual particle diameters, and calculating an average value of the particle diameters.

(6) Measurement of pH of Activation Agent

To 70 g of pure water was added 3.5 g of an activation agent, and the obtained solution was stirred well by a stirrer to measure pH using a pH meter with a glass electrode.

(7) Measurement of Combustible Substance Content by Thermogravimetric Measurement (TG)

A weight percentage of a combustible substance included in each of an active material in an electrode material mixture and an active material obtained in a post-activation mixture was measured by a thermogravimetric analyzer (TG). The measurement was performed under the following conditions, and a weight reduction percentage observed in a temperature range of 200 to 1000° C. was defined as the combustible substance content.

Measurement Conditions of Thermogravimetric Measurement (TG)

Apparatus: thermogravimetric-differential thermal simultaneous analyzer (TG/DTA 6200) manufactured by Seiko Instruments Inc.

Pan: platinum

Initial amount of sample: approximately 5 mg

Atmosphere: air

Temperature increase rate: 10° C./min (8) Measurement of Fluorine Included in Aqueous Solution By using the solid-liquid separation of slurry in the active material recovery step, fluorine components derived from a binder and an electrolytic solution included in a waste battery material are extracted in a filtrate in the solid-liquid separation step. Fluorine recovered in the filtrate obtained in the solid-liquid separation step after the slurrying step using an aqueous solution as a solution for slurrying was measured by a fluorine ion meter (fluoride ion electrode 6561-10C, and a pH/ion meter KASUTANI LAB F-24, both manufactured by Horiba Ltd) according to the following procedures.

Using a micropipette, 1 mL of a solution for the measurement was collected and added in 50 mL of pure water. The obtained solution was stirred and the pH of the solution was measured by the pH meter. A KOH solution (pH: 12) or an HCl solution (pH: 1) was added to adjust the pH of the solution in a range of 6 to 7. Furthermore, pure water was added up to 100 mL.

The fluorine concentration of the solution was measured using the fluorine ion meter. The fluorine concentration of the solution was converted to the amount of fluorine recovered in the filtrate.

1. Production of Electrode (Positive Electrode)

For an evaluation on the discharge capacity of an active material, an electrode (positive electrode) was produced according to the following procedures.

In order to produce the electrode, in addition to the active material for evaluation of the discharge capacity, a conductive material and a binder as below were used:

(a) active material (positive electrode active material): a prescribed active material;

(b) conductive material: a mixture of acetylene black (manufactured by Denki Kagaku Kogyo K.K., item's stock number: DENKA BLACK HS100) and graphite (manufactured by SEC Carbon Co., Ltd., item's stock number: graphite powder SNO-3) in a weight ratio of 9:1; and (c) binder: PVdF #7300 (manufactured by Kureha Corporation).

Amounts of the active material, the conductive material, and the binder solution were adjusted such that a weight ratio of the active material, the conductive material, and the binder was 87:10:3, respectively. Then, these materials were kneaded in an agate mortar to prepare a positive electrode material mixture paste. The binder solution used was an NMP solution containing PVdF as a binder. NMP was added to adjust such that the total of weights of the active material, the conductive material, and the binder in the positive electrode material mixture paste was 50% by weight.

Then, 1 g of the positive electrode material mixture paste was applied on an Al foil current collector (3×5 cm) such that the amount of the electrode material mixture was 9 mg/cm$^2$, and was vacuum-dried for 8 hours at 150° C. to obtain a positive electrode.

2. Production of Battery

The positive electrode, an electrolytic solution, a separator, and a negative electrode were assembled into a non-aqueous electrolyte secondary battery (coin-type battery R2032). The assembly of the battery was performed in a glove box with an argon atmosphere.

The electrolytic solution used was a solution of LiPF$_6$ as an electrolyte dissolved in a mixed solvent of ethylene carbonate, dimethyl carbonate, and ethyl methyl carbonate with a volume ratio of 30:35:35, respectively.

The separator used was a laminate film separator formed by laminating a heat-resistant porous layer on a polyethylene porous film.

In addition, metal lithium was used as the negative electrode.

3. Charge/Discharge Test

Using the produced coin battery, at a retention temperature of 25° C., a charge/discharge test was performed under the following conditions. In the charge/discharge test, discharge capacity was measured by changing the discharge current in discharging.

Maximum charge voltage: 4.3 V
Charging time: 8 hours
Charge current: 0.2 mA/cm$^2$ During discharging, the minimum discharge voltage was maintained constant at 2.5 V and discharging was performed by changing the discharge current in each cycle as follows:

First cycle discharge (0.2 C): discharge current 0.2 mA/cm$^2$
Second cycle discharge (0.2 C): discharge current 0.2 mA/cm$^2$
Third cycle discharge (1 C): discharge current 1.0 mA/cm$^2$
Fourth cycle discharge (2 C): discharge current 2.0 mA/cm$^2$
Fifth cycle discharge (5 C): discharge current 5.0 mA/cm$^2$
Sixth cycle discharge (10 C): discharge current 10 mA/cm$^2$ As the discharge capacity at 0.2 C is larger, the rated capacity obtained is higher, and the discharge capacity at 5 C is larger, the output characteristics obtained are higher.

I. Recovery of Active Material from Positive Electrode Including Conductive Material Made of Only Acetylene Black <Production of Positive Electrode Including Conductive Material Made of Only Acetylene Black, as Waste Battery Material>

Using T.K. HIGH BIS MIX (manufactured by Primix Corp.), 13.5 kg of an active material, 0.75 kg of a conductive material, 0.75 kg of a binder, and 15 kg of a solvent were mixed together and then dispersed by T.K. FILL MIX 56-50 model (manufactured by Primix Corp.). The resulting mixture dispersion was subjected to defoaming treatment using T.K. HIGH BIS MIX (manufactured by Primix Corp) to produce a positive electrode material mixture paste.

The active material used was a positive electrode active material in which the composition thereof measured by ICP atomic emission spectrometry was Li$_{1.07}$Ni$_{0.47}$Mn$_{0.48}$Fe$_{0.05}$O$_2$; the crystal structure thereof measured by X-ray powder diffraction measurement was R-3m; the BET specific surface area thereof was 10 m$^2$/g; and the average primary particle diameter thereof measured from an image obtained by SEM observation was 200 nm. In the charge/discharge test of a coin battery using the active material (unused active material) as a positive electrode active material, the discharge capacity measured at 0.2 C was 138 mAh/g and the discharge capacity measured at 5 C was 106 mAh/g.

The conductive material used was acetylene black HS100 (manufactured by Denki Kagaku Kogyo K.K). The BET specific surface area of the acetylene black was 40 m$^2$/g, and the average primary particle diameter thereof measured from an image obtained by SEM observation was 50 nm.

Regarding the binder and the solvent, an additional NMP solvent was further added into an NMP solution containing 5% by weight of PVdF #7300 (manufactured by Kureha Corporation) as the binder to adjust to the prescribed ratio.

The positive electrode material mixture paste was applied on aluminium foil 1085 with the thickness of 20 μm (manufactured by Nippon Foil Mfg. Co., Ltd.) for a positive electrode current collector of lithium secondary battery, using a slit die coater for secondary battery, and then dried to obtain an electrode. The amount of the electrode material mixture on the aluminium foil was 15 mg/cm$^2$.

<Recovery of Active Material from Waste Electrode Material>

Using the positive electrode produced above including the conductive material made of only acetylene black, the recovery of an active material was performed by Examples and Comparative Examples below.

(1) Recovery of Electrode Material Mixture

From the produced positive electrode including the conductive material made of only acetylene black, the electrode material mixture was mechanically peeled to separate the electrode material mixture from the current collector.

(2) Activation Agent Mixing Step

A prescribed amount of an activation agent was added to a prescribed amount of the electrode material mixture and mixed therewith by a mortar to produce a pre-activation mixture.

(3) Activation Step

The pre-activation mixture was placed in a calcination container made of alumina and the container was installed in an electric furnace. In the electric furnace with an air atmosphere, the mixture was heated at a prescribed retention temperature for a prescribed retention time. The heating rate was 200° C./hour and cooling was done by natural cooling. After having been cooled down to room temperature, a post-activation mixture was recovered.

(4-1) Slurrying Step

The post-activation mixture was pulverized and distilled water was added thereto to provide a slurry. The slurry was stirred and then subjected to decantation.

(4-2) Solid-Liquid Separation Step

The slurry was filtered to separate a solid phase.

(4-3) Drying Step

The solid phase was dried at 300° C. for 6 hours to obtain an active material.

(5-1) Recovery of Fluorine Component

The concentration of fluorine ion included in the liquid phase obtained after filtering the solid phase in the solid-liquid separation step was measured by the fluorine ion meter. In addition, a calcium chloride aqueous solution was added to the liquid phase to filter a precipitant produced in the liquid phase, thereby obtaining a recovered product by the fluorine component recovery operation.

(5-2) Recovery of Alkali Metal Component

The moisture was evaporated at 80° C. from the liquid phase after filtering and recovering the precipitant in (5-1) the fluorine component recovery, whereby precipitation was made to obtain a recovered product by an alkali metal component recovery operation.

Comparative Example 1-1

No Use of Activation Agent

Five g of an electrode material mixture taken out from the positive electrode including conductive material made of only acetylene black was heated at 700° C. for 4 hours without mixing any activation agent therein. The treatment conditions are indicated in Table 1-A.

Table 1-B indicates the composition, the crystal structure, the average particle diameter, and the specific surface area of the recovered product, the combustible substance content, and the discharge capacities at 0.2 C and 5 C measured by charge/discharge test of a coin battery using the recovered product as a positive electrode active material.

The recovered product had a crystal structure including an R3-m structure and a structure different from R3-m. The discharge capacities at 0.2 C and 5 C were low.

Example 1-1

$K_2CO_3/Na_2CO_3$ Activation Agent

In 5 g of the same electrode material mixture as in Comparative Example 1-1 was mixed an activation agent including $K_2CO_3$ and $Na_2CO_3$ in amounts of 0.1 mol and 0.1 mol, respectively, with respect to 1 mol of the positive electrode active material in the electrode material mixture to produce a pre-activation mixture. The obtained mixture was subjected to activation at a retention temperature of 700° C. for a retention time of 4 hours. The post-activation mixture recovered was made into a slurry, which was then filtered and dried to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the recovered product as a positive electrode active material.

The crystal structure of the active material was of only R3-m. The discharge capacities thereof at 0.2 C and 5 C were higher than in Comparative Example 1-1 and approximately the same as in the unused active material.

Example 1-2

$Li_2CO_3/K_2CO_3$ Activation Agent

In 5 g of the same electrode material mixture as in Comparative Example 1-1 was mixed an activation agent including $Li_2CO_3$ and $K_2CO_3$ in amounts of 0.1 mol and 0.1 mol, respectively, with respect to 1 mol of the positive electrode active material in the electrode material mixture to produce a pre-activation mixture. The mixture was subjected to activation at the retention temperature of 700° C. for the retention time of 4 hours. The post-activation mixture recovered was made into a slurry, which was then filtered and dried to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as those in the unused active material.

Example 1-3

$Li_2CO_3/K_2SO_4$ Activation Agent

In 5 g of the same electrode material mixture as in Comparative Example 1-1 was mixed an activation agent including $Li_2CO_3$ and $K_2SO_4$ in amounts of 0.1 mol and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as in the unused active material.

Example 1-4

NaOH Activation Agent

In 5 g of the same electrode material mixture as in Comparative Example 1-1 was mixed an activation agent including NaOH in an amount of 0.2 mol with respect to 1 mol of the positive electrode active material in the electrode material mixture to produce a pre-activation mixture. The mixture was subjected to activation at a retention temperature of 400° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as in the unused active material.

Example 1-5

NaOH/KOH Activation Agent

In 5 g of the same electrode material mixture as in Comparative Example 1-1 was mixed an activation agent including NaOH and KOH in amounts of 0.1 mol and 0.1 mol, respectively, with respect to 1 mol of the positive electrode active material in the electrode material mixture to produce a pre-activation mixture. The mixture product was subjected to activation at the retention temperature of 400° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as in the unused active material.

Example 1-6

LiOH/KOH Activation Agent

In 5 g of the same electrode material mixture as in Comparative Example 1-1 was mixed an activation agent including LiOH and KOH in amounts of 0.1 mol and 0.1 mol, respectively, with respect to 1 mol of the positive electrode active material in the electrode material mixture to produce a pre-activation mixture. The mixture was subjected to activation at the retention temperature of 400° C. for the retention time of 4 hours, and the other conditions were made the same as those in Example 1-1 to obtain an active material. The post-activation mixture recovered was made into a slurry, which was then filtered and dried to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as in the positive electrode active material before use.

Example 1-7

LiOH Activation Agent

In 5 g of the same electrode material mixture as in Comparative Example 1-1 was mixed an activation agent including LiOH in an amount of 0.3 mol with respect to 1 mol of the positive electrode active material in the electrode material mixture to produce a pre-activation mixture. The mixture was subjected to activation at a retention temperature of 500° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as in the positive electrode active material before use.

A recovered product obtained by a fluorine component recovery operation was identified by X-ray powder diffraction measurement, and a peak corresponding to calcium fluoride was observed. In other words, the fluorine recovery operation allowed the recovery of the fluorine component.

A recovered product obtained by an alkali metal component recovery operation was identified by X-ray powder diffraction measurement, and a peak corresponding to lithium chloride was observed. In other words, the fluorine component recovery operation allowed the recovery of the lithium component as an alkali metal component.

Example 1-8

KOH Activation Agent

In 5 g of the same electrode material mixture as in Comparative Example 1-1 was mixed an activation agent including KOH in an amount of 0.1 mol with respect to 1 mol of the positive electrode active material in the electrode material mixture to produce a pre-activation mixture. The mixture was subjected to activation at the retention temperature of 500° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the active material as a positive electrode active material.

The crystal structure of the active material was of only R3-m. The discharge capacities thereof at 0.2 C and 5 C were higher than in Comparative Example 1-1 and approximately the same as in the positive electrode active material before use.

A recovered product obtained by a fluorine component recovery operation was identified by X-ray powder diffraction measurement, and a peak corresponding to calcium fluoride was observed. In other words, the fluorine recovery operation allowed the recovery of the fluorine component.

Example 1-9

$Li_2O_2$/NaOH Activation Agent

In 2 g of the same electrode material mixture as in Comparative Example 1-1 was mixed an activation agent including $Li_2O_2$ and NaOH in amounts of 0.1 mol and 1 mol, respectively, with respect to 1 mol of the positive electrode active material in the electrode material mixture to produce a pre-activation mixture. The mixture was subjected to activation at a retention temperature of 350° C. for a retention time of 12 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and approximately the same as in the unused active material.

Fluorine ion contained in a filtrate separated from the active material in the solid-liquid separation step was measured, whereby the recovery of 37 mg of fluorine in the aqueous solution was observed. This was equivalent to a recovery rate of 63% of a fluorine component included in the electrode material mixture before treatment.

Example 1-10

$LiNO_3$ Activation Agent

In 2 g of the same electrode material mixture as in Comparative Example 1-1 was mixed an activation agent including $LiNO_3$ in an amount of 0.2 mol with respect to 1 mol of the positive electrode active material in the electrode material mixture to produce a pre-activation mixture. The mixture was subjected to activation at the retention temperature of 350° C. for the retention time of 12 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and approximately the same as in the unused active material.

Example 1-11

$KNO_3$ Activation Agent

In 2 g of the same electrode material mixture as in Comparative Example 1-1 was mixed an activation agent including $KNO_3$ in an amount of 0.1 mol with respect to 1 mol of the positive electrode active material in the electrode material mixture to produce a pre-activation mixture. The mixture was subjected to activation at the retention temperature of 350° C. for the retention time of 12 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and approximately the same as in the unused active material.

Example 1-12

$KNO_3/KOH$ Activation Agent

In 2 g of the same electrode material mixture as in Comparative Example 1-1 was mixed an activation agent including $KNO_3$ and KOH in amounts of 0.1 mol and 0.1 mol, respectively, with respect to 1 mol of the positive electrode active material in the electrode material mixture to produce a pre-activation mixture. The mixture was subjected to activation at a retention temperature of 250° C. for the retention time of 12 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and approximately the same as in the unused active material.

Example 1-13

$Li_2CO_3/Na_2CO_3$ Activation Agent

In 2 g of the same electrode material mixture as in Comparative Example 1-1 was mixed an activation agent including $Li_2CO_3$ and $Na_2CO_3$ in amounts of 0.1 mol and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the obtained active material was used as a positive electrode active material.

The crystal structure of the active material was of only R3-m. The discharge capacities thereof at 0.2 C and 5 C were higher than in Comparative Example 1-1 and higher than in the unused active material.

Example 1-14

$Li_2CO_3/Na_2CO_3/Na_2SO_4$ Activation Agent

In 2 g of the same electrode material mixture as in Comparative Example 1-1 was mixed an activation agent including $Li_2CO_3$, $Na_2CO_3$, and $Na_2SO_4$ in amounts of 0.1 mol, 0.1 mol, and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content therein, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and higher than in the unused active material.

Example 1-15

$Li_2CO_3/Na_2CO_3/NaVO_3$ Activation Agent

In 2 g of the same electrode material mixture as in Comparative Example 1-1 was mixed an activation agent including $Li_2CO_3$, $Na_2CO_3$, and $NaVO_3$ in amounts of 0.1 mol, 0.1 mol, and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content therein, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1.

Example 1-16

$Li_2CO_3/Na_2CO_3/K_2MoO_4$ Activation Agent

In 2 g of the same electrode material mixture as in Comparative Example 1-1 was mixed an activation agent including $Li_2CO_3$, $Na_2CO_3$, and $K_2MoO_4$ in amounts of 0.1 mol, 0.1 mol, and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content therein, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and approximately the same as in the unused active material.

Example 1-17

$Li_2CO_3/Na_2CO_3/K_2PO_4$ Activation Agent

In 2 g of the same electrode material mixture as in Comparative Example 1-1 was mixed an activation agent including $Li_2CO_3$, $Na_2CO_3$, and $K_2PO_4$ in amounts of 0.1 mol, 0.1 mol, and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content therein, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1.

Example 1-18

$Li_2CO_3/Na_2CO_3/K_2WO_4$ Activation Agent

In 2 g of the same electrode material mixture as in Comparative Example 1-1 was mixed an activation agent including $Li_2CO_3$, $Na_2CO_3$, and $K_2WO_4$ in amounts of 0.1 mol, 0.1 mol, and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content therein, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1 and higher than in the unused active material.

Example 1-19

$Li_2CO_3/Na_2CO_3/B_2O_3$ Activation Agent

In 2 g of the same electrode material mixture as in Comparative Example 1-1 was mixed an activation agent including $Li_2CO_3$, $Na_2CO_3$, and $B_2O_3$ in amounts of 0.1 mol, 0.1 mol, and 0.1 mol, respectively, with respect to 1 mol of the positive electrode active material in the electrode material mixture to produce a pre-activation mixture. The mixture was subjected to activation at the retention temperature of 700° C. for the retention time of 4 hours, and the other conditions were made the same as those in Example 1-1 to obtain an active material. The treatment conditions are indicated in Table 1-A.

Table 1-B indicates the composition, the crystal structure, the average particle diameter, and the specific surface area of the obtained active material, the combustible substance content therein, the amount of recovered fluorine (recovery rate), and the discharge capacities at 0.2 C and 5 C measured by charge/discharge test of a coin battery using the obtained active material as a positive electrode active material.

The crystal structure of the active material was of only R3-m. The discharge capacities thereof at 0.2 C and 5 C were higher than in Comparative Example 1-1.

TABLE 1-A

Treatment Conditions for Recovery of Active Material from Positive Electrode Including Conductive Material Made of Only Acetylene Black (Solid-Liquid Separation of Slurry)

| | Activation agent (*Amount of addition) | pH of activation agent | Melting point of activation agent | Retention temperature/ retention time |
|---|---|---|---|---|
| Comp. Ex. 1-1 | None | — | — | 700° C./4 H |
| Ex. 1-1 | $Na_2CO_3$ (0.1 mol) $K_2CO_3$ (0.1 mol) | 11 | 700° C. | 700° C./4 H |
| Ex. 1-2 | $Li_2CO_3$ (0.1 mol) $K_2CO_3$ (0.1 mol) | 11 | 490° C. | 700° C./4 H |
| Ex. 1-3 | $Li_2CO_3$ (0.1 mol) $K_2SO_4$ (0.1 mol) | 11 | 550° C. | 700° C./4 H |
| Ex. 1-4 | NaOH (0.2 mol) | 13 | 300° C. | 400° C./4 H |
| Ex. 1-5 | NaOH (0.1 mol) KOH ((0.1 mol) | 13 | 170° C. | 400° C./4 H |
| Ex. 1-6 | LiOH (0.1 mol) KOH (0.1 mol) | 13 | 220° C. | 400° C./4 H |
| Ex. 1-7 | LiOH (0.3 mol) | 12 | 470° C. | 500° C./4 H |
| Ex. 1-8 | KOH (0.1 mol) | 13 | 360° C. | 500° C./4 H |
| Ex. 1-9 | $Li_2O_2$ (0.1 mol) NaOH (1 mol) | 12.8 | 222° C. | 350° C./12 H |
| Ex. 1-10 | $LiNO_3$ (0.2 mol) | 5.8 | 261° C. | 350° C./12 H |
| Ex. 1-11 | $KNO_3$ (0.1 mol) | 5.7 | 333° C. | 350° C./12 H |
| Ex. 1-12 | $KNO_3$ (0.1 mol) KOH (0.1 mol) | 13.6 | 217° C. | 250° C./12 H |
| Ex. 1-13 | $Li_2CO_3$ (0.1 mol) $Na_2CO_3$ (0.1 mol) | 11.5 | 500° C. | 700° C./4 H |
| Ex. 1-14 | $Li_2CO_3$ (0.1 mol) $Na_2CO_3$ (0.1 mol) $Na_2SO_4$ (0.1 mol) | 11.6 | 500° C. | 700° C./4 H |
| Ex. 1-15 | $Li_2CO_3$ (0.1 mol) $Na_2CO_3$ (0.1 mol) $NaVO_3$ (0.1 mol) | 11.5 | 500° C. | 700° C./4 H |
| Ex. 1-16 | $Li_2CO_3$ (0.1 mol) $Na_2CO_3$ (0.1 mol) $K_2MoO_4$ (0.1 mol) | 11.5 | 500° C. | 700° C./4 H |
| Ex. 1-17 | $Li_2CO_3$ (0.1 mol) $Na_2CO_3$ (0.1 mol) $K_3PO_4$ (0.1 mol) | 11.5 | 500° C. | 700° C./4 H |
| Ex. 1-18 | $Li_2CO_3$ (0.1 mol) $Na_2CO_3$ (0.1 mol) $K_2WO_4$ (0.1 mol) | 11.5 | 500° C. | 700° C./4 H |
| Ex. 1-19 | $Li_2CO_3$ (0.1 mol) $Na_2CO_3$ (0.1 mol) $B_2O_3$ (0.1 mol) | 11.5 | 500° C. | 700° C./4 H |

*The amounts in parentheses each represent the amount of addition of the activation agent with respect to 1 mol of the positive electrode material constituting the electrode material mixture.

TABLE 1-B

Powder Properties and Battery characteristics of Active Material Recovered from Positive Electrode Including Conductive Material Made of Only Acetylene Black (Solid-Liquid Separation of Slurry)

| | Composition | Crystal structure | Average particle diameter [nm] | Specific surface area [m²/g] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|---|
| Untreated positive electrode material | $Li_{1.07}Ni_{0.47}Mn_{0.48}Fe_{0.05}O_2$ | R-3m | 200 | 10 | — | | 138 | 106 |
| Comp. Ex. 1-1 | $Li_{0.91}Ni_{0.47}Mn_{0.48}Fe_{0.05}O_2$ | R-3m Heterogeneous phase | 200 | 10 | 1.6 | | 57 | 15 |
| Ex. 1-1 | $Li_{1.02}Ni_{0.47}Mn_{0.48}Fe_{0.05}O_2$ | R-3m | 200 | 11 | 0.7 | | 135 | 94 |
| Ex. 1-2 | $Li_{1.08}Ni_{0.47}Mn_{0.48}Fe_{0.05}O_2$ | R-3m | 200 | 11 | 0.1 | | 137 | 99 |
| Ex. 1-3 | $Li_{1.01}Ni_{0.47}Mn_{0.48}Fe_{0.05}O_2$ | R-3m | 200 | 12 | 0.7 | | 132 | 84 |
| Ex. 1-4 | $Li_{1.04}Ni_{0.47}Mn_{0.48}Fe_{0.05}O_2$ | R-3m | 200 | 11 | 0.1 | | 143 | 103 |
| Ex. 1-5 | $Li_{1.02}Ni_{0.47}Mn_{0.48}Fe_{0.05}O_2$ | R-3m | 200 | 12 | 0.1 | | 137 | 98 |
| Ex. 1-6 | $Li_{1.02}Ni_{0.47}Mn_{0.48}Fe_{0.05}O_2$ | R-3m | 200 | 13 | 0.1 | | 128 | 79 |
| Ex. 1-7 | $Li_{1.00}Ni_{0.47}Mn_{0.48}Fe_{0.05}O_2$ | R-3m | 200 | 10 | 0.1 | | 142 | 108 |
| Ex. 1-8 | $Li_{0.91}Ni_{0.47}Mn_{0.48}Fe_{0.05}O_2$ | R-3m | 200 | 12 | 0.1 | | 123 | 74 |
| Ex. 1-9 | $Li_{0.97}Ni_{0.47}Mn_{0.48}Fe_{0.05}O_2$ | R-3m | 200 | 12 | 1.6 | 37 (63%) | 137 | 103 |
| Ex. 1-10 | $Li_{0.96}Ni_{0.47}Mn_{0.48}Fe_{0.05}O_2$ | R-3m | 200 | 11 | 2.3 | 36 (61%) | 136 | 104 |
| Ex. 1-11 | $Li_{0.85}Ni_{0.47}Mn_{0.48}Fe_{0.05}O_2$ | R-3m | 200 | 14 | 4.2 | 45 (75%) | 135 | 103 |
| Ex. 1-12 | $Li_{1.05}Ni_{0.47}Mn_{0.48}Fe_{0.05}O_2$ | R-3m | 200 | 13 | 3.1 | 5.7 (100%) | 135 | 106 |
| Ex. 1-13 | $Li_{1.07}Ni_{0.47}Mn_{0.48}Fe_{0.05}O_2$ | R-3m | 200 | 10 | 0.2 | 48 (81%) | 143 | 110 |
| Ex. 1-14 | $Li_{1.08}Ni_{0.47}Mn_{0.48}Fe_{0.05}O_2$ | R-3m | 200 | 10 | 0 | 36 (61%) | 142 | 112 |

TABLE 1-B-continued

Powder Properties and Battery characteristics of Active Material Recovered from
Positive Electrode Including Conductive Material Made of Only Acetylene Black
(Solid-Liquid Separation of Slurry)

|  | Composition | Crystal structure | Average particle diameter [nm] | Specific surface area [m²/g] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|---|
| Ex. 1-15 | $Li_{1.06}Ni_{0.47}Mn_{0.48}Fe_{0.05}O_2$ | R-3m | 200 | 11 | 0 | 37 (63%) | 133 | 116 |
| Ex. 1-16 | $Li_{1.04}Ni_{0.47}Mn_{0.48}Fe_{0.05}O_2$ | R-3m | 200 | 11 | 0 | 37 (63%) | 140 | 129 |
| Ex. 1-17 | $Li_{0.97}Ni_{0.47}Mn_{0.48}Fe_{0.05}O_2$ | R-3m | 200 | 10 | 0 | 42 (70%) | 124 | 107 |
| Ex. 1-18 | $Li_{0.96}Ni_{0.47}Mn_{0.48}Fe_{0.05}O_2$ | R-3m | 200 | 12 | 0 | 35 (59%) | 141 | 130 |
| Ex. 1-19 | $Li_{0.85}Ni_{0.47}Mn_{0.48}Fe_{0.05}O_2$ | R-3m | 200 | 10 | 0.1 | 42 (70%) | 128 | 109 |

II. Reference Example

Respective Influences of Conductive Material and Binder in Activation Step

Reference Example 1 and Reference Example 2 studied on the respective influences of a conductive material and a binder in an activation step.

Reference Example 1

Influence of Conductive Material in Activation Step

To 5 g of the unused active material was added 0.263 g of acetylene black as a conductive material to produce a mixture of the positive electrode active material and the conductive material. The mixture corresponds to a mixture recovered after immersing an electrode material mixture in an organic solvent to dissolve a binder. The mixture was heated at the retention temperature of 700° C. for the retention time of 4 hours without adding any activation agent thereto.

Table 2 indicates the crystal structure, the average particle diameter, and the specific surface area of the recovered product after the heat treatment, and discharge capacities at 0.2 C and 5 C measured by charge/discharge test of a coin battery using the recovered product as a positive electrode active material.

The crystal structure of the recovered product was of only R3-m. The discharge capacities thereof at 0.2 C and 5 C were approximately the same as in the unused active material.

Reference Example 2

Influence of Binder on Reuse Method

In 5 g of the unused active material was mixed 5.26 g of an NMP solution containing 5% by weight of PVdF as a binder, and then the mixture was vacuum-dried at 150° C. for 8 hours to remove the solvent, thereby producing a mixture of the positive electrode active material and the binder. The mixture was heated at the retention temperature of 700° C. for the retention time of 4 hours without adding any activation agent thereto.

Table 2 indicates the crystal structure, the average particle diameter, and the specific surface area of the recovered product after the heat treatment, and discharge capacities at 0.2 C and 5 C measured by charge/discharge test of a coin battery using the recovered product as a positive electrode active material.

The recovered product had a crystal structure including a structure different from R3-m. The discharge capacities of the recovered product at 0.2 C and 5 C were lower than in the unused active material.

TABLE 2

Influences of Conductive Material and Binder
on Reuse Method of Active Material Recovered
from Waste Battery Material

|  |  | Retention temperature/ retention time [° C.] | Crystal structure | Average particle diameter [nm] | Specific surface area [m²/g] | Discharge capacity at 0.2 C [mAh/g] | Discharge capacity at 5 C [mAh/g] |
|---|---|---|---|---|---|---|---|
| Ref. Ex. 1 | Positive electrode active material + conductive material | 700° C./ 4 H | R-3m | 200 | 10 | 141 | 108 |
| Ref. Ex. 2 | Positive electrode active material + PVDF | 700° C./ 4 H | R-3m Heterogeneous phase | 200 | 10 | 103 | 39 |

III. Recovery of Active Material from Positive Electrode Including Graphite-Based Conductive Material <Production of Positive Electrode Including Graphite-Based Conductive Material>

An active material, a conductive material, and a binder were weighed out to have a weight ratio of 85:10:5, then, viscosity adjustments were made with an NMP solvent, and the materials were mixed together by DISPERMAT (manufactured by Vam-Geztmann GmbH) to produce a positive electrode material mixture paste.

The active material used was a positive electrode active material in which the composition measured by ICP atomic emission spectrometry was $LiNi_{0.44}Co_{0.10}Mn_{0.46}O_2$; the crystal structure measured by X-ray powder diffraction measurement was of R-3 m; the BET specific surface area was 8 $m^2/g$; and the average primary particle diameter measured from an image obtained by SEM observation was 200 nm. In a coin battery using the active material (unused active material) as a positive electrode active material, discharge capacities at 0.2 C and at 5 C, respectively, measured by charge/discharge test were 153 mAh/g and 114 mAh/g, respectively.

The conductive material included acetylene black and a graphite-based conductive material. Acetylene black HS100 (manufactured by Denki Kagaku Kogyo K.K.), graphite C-NERGY SFG6L (manufactured by Timcal Graphite & Carbon Inc.), and graphite C-NERGY KS6L (manufactured by Timcal Graphite & Carbon Inc.) were mixed together to have a weight ratio of 4:3:3 for use. The respective BET specific surface areas of HS100, SFG6L, and KS6L were 40 $m^2/g$, 17 $m^2/g$, and 20 $m^2/g$, respectively, and the respective average primary particle diameters thereof were 50 nm, 3.5 μm, and 3.5 μm, respectively.

Regarding the binder and the solvent, an additional NMP solvent was further added into an NMP solution containing 5% by weight of PVdF #7300 (manufactured by Kureha Corporation) as a binder to adjust the viscosity.

The positive electrode material mixture paste was applied on aluminium foil 1085 with the thickness of 20 μm (manufactured by Nippon Foil Mfg. Co. Ltd.) for a positive electrode current collector of lithium ion secondary battery by a coater for secondary battery, and then dried to obtain an electrode. The amount of the electrode material mixture on the aluminium foil was 16 $mg/cm^2$.

<Recovery of Active Material from Waste Electrode Material>

Using the positive electrode including the graphite-based conductive material produced above, the recovery of an active material was performed by Examples and Comparative Examples below.

Comparative Example 3-1

No Use of Activation Agent

Two g of an electrode material mixture mechanically peeled from the positive electrode including the graphite-based conductive material described above, the mixture was heated at a retention temperature of 600° C. for the retention time of 4 hours without mixing any activation agent therein. The treatment conditions are indicated in Table 3-A.

Table 3-B indicates the composition, the crystal structure, the average particle diameter, and the specific surface area of the recovered product, the combustible substance content, and the discharge capacities at 0.2 C and 5 C measured by charge/discharge test of a coin battery using the recovered product as a positive electrode active material.

The recovered product contained a combustible substance. The crystal structure of the recovered product included a structure different from R3-m. The discharge capacities at 0.2 C and 5 C were low.

Example 3-1

$Li_2CO_3/Na_2SO_4$ Activation Agent

In the same electrode material mixture mechanically peeled from the positive electrode including the graphite-based conductive material as in Comparative Example 3-1 was mixed an activation agent including $Li_2CO_3$ and $Na_2SO_4$ in amounts of 0.1 mol and 0.1 mol, respectively, with respect to 1 mol of the positive electrode active material in the electrode material mixture to produce a pre-activation mixture. The mixture was subjected to activation at a retention temperature of 600° C. for the retention time of 4 hours, and the other conditions were made the same as those in Example 1-1 to obtain an active material. The treatment conditions are indicated in Table 3-A.

Table 3-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the active material as a positive electrode active material.

The obtained active material contained no combustible substance. The crystal structure of the active material was of only R3-m. The discharge capacities at 0.2 C and 5 C were higher than in Comparative Example 3-1 and the discharge capacity at 0.2 C was approximately the same as in the unused active material.

TABLE 3-A

Treatment Conditions for Recovery of Active Material from Positive Electrode Including Graphite-Based Conductive Material (Solid-Liquid Separation of Slurry)

| | Activation agent (*Amount of addition) | pH of activation agent | Melting point of activation agent | Retention temperature/ retention time |
|---|---|---|---|---|
| Comp. Ex. 3-1 | None | — | — | 600° C./4 H |
| Ex. 3-1 | $Li_2CO_3$ (0.1 mol) $Na_2SO_4$ (0.1 mol) | 11.5 | 510° C. | 600° C./4 H |

*The amounts in parentheses each represent the amount of addition of the activation agent with respect to 1 mol of the positive electrode material constituting the electrode material mixture.

TABLE 3-B

Powder Properties and Battery characteristics of Active Material
Recovered from Waste Electrode Including Graphite Conductive Material
(Solid-Liquid Separation of Slurry)

| | Composition | Crystal structure | Average particle diameter [nm] | Specific surface area [m$^2$/g] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|---|
| Untreated positive electrode material | Li$_{1.11}$Ni$_{0.44}$Co$_{0.10}$Mn$_{0.46}$O$_2$ | R-3m | 200 | 8 | | | 153 | 114 |
| Comp. Ex. 3-1 | Li$_{1.11}$Ni$_{0.44}$Co$_{0.10}$Mn$_{0.46}$O$_2$ | R-3m Heterogeneous phase | 200 | 4 | 3.2 | — | 101 | 59 |
| Ex. 3-1 | Li$_{1.03}$Ni$_{0.44}$Co$_{0.10}$Mn$_{0.46}$O$_2$ | R-3m | 200 | 11 | 0.7 | 35 (59%) | 154 | 127 |

IV. Recovery of Active Material Using Positive Electrode Taken Out from Used Battery A used battery subjected to repeated charging/discharging cycles was disassembled to take out a positive electrode. The positive electrode taken out from the used battery was used as a waste battery material to recover an active material from the positive electrode.

<Structure of Positive Electrode Taken Out from Used Battery>

The structure of the positive electrode taken out from the used battery was as follows: The positive electrode had an electrode material mixture laminated on aluminium foil 1085 (manufactured by Nippon Foil Mfg. Co. Ltd.) for a positive electrode current collector. The electrode material mixture was composed of an active material, a conductive material, and a binder as below.

The active material constituting the positive electrode taken out from the used battery was a positive electrode active material as an used active material, in which the composition measured by ICP atomic emission spectrometry was Li$_{1.07}$Ni$_{0.47}$Mn$_{0.48}$Fe$_{0.05}$O$_2$; the crystal structure measured by X-ray powder diffraction measurement was of R-3 m; the BET specific surface area was 10 m$^2$/g; and the average primary particle diameter measured from an image obtained by SEM observation was 200 nm. In a coin battery using the active material (the unused active material) as a positive electrode active material, the discharge capacities at 0.2 C and 5 C measured by charge/discharge test were 138 mAh/g and 106 mAh/g.

In the positive electrode taken out from the used battery, the composition of the active material was Li$_{0.79}$Ni$_{0.47}$Mn$_{0.48}$Fe$_{0.05}$O$_2$, where there was reduction in the composition of lithium in the active material due to the use of the battery. In addition, discharge capacities at 0.2 C and 5 C, respectively, measured by charge/discharge test of a coin battery using the positive electrode recovered from the used battery were 56 mAn/g and 15 mAh/g, respectively. Thus, the use of the battery was observed to have reduced the discharge capacities at 0.2 C and 5 C of the active material more than in the unused active material.

The conductive material constituting the positive electrode recovered from the used battery was a mixture of acetylene black HS100 (DENKA BLACK manufactured by Denki Kagaku Kogyo K.K.), graphite SNO-3 (graphite powder manufactured by SEC Carbon Co., Ltd.), graphite KS15 (manufactured by Timcal Graphite & Carbon Inc.), and graphite KS4 (manufactured by Timcal Graphite & Carbon Inc.) in a weight ratio of 10:1.5:2.0:1.5. The respective BET specific surface areas of acetylene black HS100 (DENKA BLACK manufactured by Denki Kagaku Kogyo K.K.), graphite SNO-3 (graphite powder manufactured by SEC Carbon Co., Ltd.), graphite KS15 (manufactured by Timcal Graphite & Carbon Inc.), and graphite KS4 (manufactured by Timcal Graphite & Carbon Inc.) were 40 m$^2$/g, 16 m$^2$/g, 12 m$^2$/g, and 26 m$^2$/g, respectively, and the respective average primary particle diameters thereof measured from images obtained by SEM observation were 50 nm, 3 μm, 8 μm, and 3 μm, respectively.

The binder used was PVdF #7300 (manufactured by Kureha Corporation).

Regarding the structural ratio of the electrode material mixture, a weight ratio of the active material:the conductive material:the binder was 80:15:5, respectively.

<Recovery of Active Material from Waste Electrode Material>

Using the positive electrode recovered from the used battery described above, the recovery of an active material was performed by Examples and Comparative Examples as below.

Comparative Example 4-1

No Use of Activation Agent

Two g of an electrode material mixture obtained by mechanically peeling from the positive electrode taken out from the used battery described above was heated at the retention temperature of 400° C. for the retention time of 4 hours without mixing any activation agent therein. The treatment conditions are indicated in Table 4-1.

Table 4-B indicates the composition, the crystal structure, the average particle diameter, and the specific surface area of the recovered product, the combustible substance content, and the discharge capacities at 0.2 C and 5 C measured by charge/discharge test of a coin battery using the recovered product as a positive electrode active material.

The recovered product was observed to have an R3-m and graphite crystal structure. The discharge capacities of the product at 0.2 C and 5 C were low.

Example 4-1

LiOH/NaOH Activation Agent

In an electrode material mixture obtained from the positive electrode taken out from the same used battery as in Comparative Example 4-1 was mixed an activation agent including LiOH and NaOH in amounts of 0.2 mol and 0.1 mol, respectively, with respect to 1 mol of the positive electrode active material in the electrode material mixture to produce a pre-activation mixture. The mixture was subjected to activation at the retention temperature of 400° C. for the retention time of 4 hours, and the other conditions were made the same as those in Example 1-1 to obtain an active material. The treatment conditions are indicated in Table 4-A.

Table 4-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the active material as a positive electrode active material.

An R3-m and graphite crystal structure was observed. A lithium composition of the active material obtained after the activation was found to have improved to the active material constituting the used battery. The discharge capacities at 0.2 C and 5 C were higher than in Comparative Example 4-1.

Example 4-2

LiOH/NaOH Activation Agent

In an electrode material mixture obtained from the positive electrode taken out from the same used battery as in Comparative Example 4-1 was mixed an activation agent including LiOH and NaOH in amounts of 1 mol and 1 mol, respectively, with respect to 1 mol of the positive electrode active material in the electrode material mixture to produce a pre-activation mixture. The mixture was subjected to activation at the retention temperature of 400° C. for the retention time of 12 hours and the other conditions were made the same as those in Example 1-1 to obtain an active material. The treatment conditions are indicated in Table 4-A.

Table 4-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the active material as a positive electrode active material.

The crystal structure observed was of R3-m and graphite. A lithium composition of the active material obtained after the activation was found to have improved to the active material constituting the used battery. The discharge capacities at 0.2 C and 5 C were higher than in Comparative Example 4-1.

Example 4-3

LiOH Activation Agent

In an electrode material mixture obtained from the positive electrode taken out from the same used battery as in Comparative Example 4-1 was mixed an activation agent including LiOH in an amount of 2 mol with respect to 1 mol of the positive electrode active material in the electrode material mixture to produce a pre-activation mixture. The mixture was subjected to activation at the retention temperature of 500° C. for a retention time of 6 hours, and the other conditions were made the same as those in Example 1-1 to obtain an active material. The treatment conditions are indicated in Table 4-A.

Table 4-B indicates the composition, the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the active material as a positive electrode active material.

The crystal structure observed was of only R3-m. Due to lithium contained in the activation agent, the lithium composition of the active material was improved as compared to the active material constituting the used battery. The discharge capacities at 0.2 C and 5 C were higher than in Comparative Example 4-1.

TABLE 4-A

Treatment Conditions for Recovery of Active Material from Positive Electrode Taken out from Used Battery (Solid-Liquid Separation of Slurry)

|  | Activation agent (*Amount of addition) | pH of activation agent | Melting point of activation agent | Retention temperature/ retention time |
|---|---|---|---|---|
| Comp. Ex. 4-1 | None | — | — | 400° C./4 H |
| Ex. 4-1 | LiOH (0.2 mol) NaOH (0.1 mol) | 13.4 | 222° C. | 400° C./4 H |
| Ex. 4-2 | LiOH (1 mol) NaOH (1 mol) | 13.4 | 222° C. | 400° C./12 H |
| Ex. 4-3 | LiOH (2 mol) | 13.4 | 471° C. | 500° C./6 H |

*The amounts in parentheses each represent the amount of addition of the activation agent with respect to 1 mol of the positive electrode material constituting the electrode material mixture.

TABLE 4-B

Powder Properties and Battery characteristics of Active Material Recovered from Positive Electrode Taken out from Used Battery (Solid-Liquid Separation of Slurry)

|  | Composition | Crystal structure | Average particle diameter [nm] | Specific surface area [m$^2$/g] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|---|
| Untreated positive electrode material | Li$_{1.07}$Ni$_{0.47}$Mn$_{0.48}$Fe$_{0.05}$O$_2$ | R-3m | 200 | 10 | — | — | 138 | 106 |
| Positive electrode material in recovered electrode | Li$_{0.79}$Ni$_{0.47}$Mn$_{0.48}$Fe$_{0.05}$O$_2$ | R-3m Graphite | 200 | — | 20 | — | 56 | 15 |
| Comp. Ex. 4-1 | Li$_{0.53}$Ni$_{0.44}$Co$_{0.10}$Mn$_{0.46}$O$_2$ | R-3m Graphite | 200 | 18 | 11.2 | — | 92 | 58 |
| Ex. 4-1 | Li$_{0.86}$Ni$_{0.47}$Mn$_{0.48}$Fe$_{0.05}$O$_2$ | R-3m Graphite | 200 | 12 | 7.3 | — | 103 | 68 |
| Ex. 4-2 | Li$_{1.06}$Ni$_{0.47}$Mn$_{0.48}$Fe$_{0.05}$O$_2$ | R-3m Graphite | 200 | 9 | 2.6 | — | 131 | 94 |
| Ex. 4-3 | Li$_{1.24}$Ni$_{0.47}$Mn$_{0.48}$Fe$_{0.05}$O$_2$ | R-3m | 200 | 8.7 | 0.8 | 32 (54%) | 116 | 67 |

V. Recovery of Active Material from Positive Electrode Using Evaporation Separation Method in Active Material Recovery Step Using the active material recovery step by an evaporation separation method, an active material was recovered from the positive electrode including the conductive material made of only acetylene black.

<Production of Positive Electrode Including Conductive Material Made of Only Acetylene Black as Waste Battery Material>

The same positive electrode including the conductive material made of only acetylene black as in Example 1-1 was used.

<Recovery of Active Material from Waste Electrode Material>

Using the positive electrode produced above, the recovery of an active material was performed by Examples and Comparative Examples below.

(1) Recovery of Electrode Material Mixture

As in Example 1-1, the electrode material mixture was mechanically peeled from the produced electrode to separate the electrode material mixture from the current collector.

(2) Activation Agent Mixing Step

As in Example 1-1, a prescribed amount of an activation agent was added to a prescribed amount of the electrode material mixture and mixed therewith using a mortar to produce a pre-activation mixture.

(3) Activation Step

As in Example 1-1, the pre-activation mixture was placed in a firing container made of alumina and the container was installed in a tubular electric furnace made of alumina. Air was allowed to flow in the tube at a prescribed flow rate, and the mixture was heated under conditions of a prescribed retention temperature and a prescribed retention time. The heating rate was 200° C./hour.

(4) Evaporation Separation Step

After the activation step, the temperature of the electric furnace was increased up to a prescribed value and the temperature was retained for a prescribed time. Air was allowed to flow in the tube at a prescribed flow rate. The heating rate was 200° C./hour. After that, natural cooling was performed. After cooling down to room temperature, an active material was recovered.

(5) Recovery of Fluorine Component

A gas discharged from the tubular electric furnace in the evaporation separation step was allowed to pass through 100 mL of pure water to capture a fluorine component in the gas. After termination of the evaporation separation step, the concentration of fluorine ion included in the solution was measured using the fluorine ion meter.

Comparative Example 5-1

No Use of Activation Agent

Two g of an electrode material mixture taken out from the positive electrode including the conductive material made of only acetylene black was heated at an air flow rate of 1 L/minute at the retention temperature of 400° C. for the retention time of 4 hours without mixing any activation agent therein. After that, the temperature was further increased to 900° C. and heating was done for 1 hour. Then, the inside of the furnace was allowed to natural cooling to obtain a recovered product. The treatment conditions are indicated in Table 5-A.

Table 5-B indicates the composition, the crystal structure, the average particle diameter, and the specific surface area of the recovered product, the combustible substance content, and the discharge capacities at 0.2 C and 5 C measured by charge/discharge test of a coin battery using the recovered product as a positive electrode active material.

The discharge capacities at 0.2 C and 5 C were low.

Example 5-1

$LiNO_3$ Activation Agent

In the same electrode material mixture as in Comparative Example 5-1 was mixed an activation agent including $LiNO_3$ in an amount of 0.1 mol, respectively, with respect to 1 mol of the positive electrode active material in the electrode material mixture to produce a pre-activation mixture. As the activation step, activation was performed at the retention temperature of 400° C. for the retention time of 4 hours. After that, as the evaporation separation step, the temperature was further increased up to 900° C. and heating was done for 1 hour. Then, natural cooling was performed to recover an active material. The treatment conditions are indicated in Table 5-A.

Table 5-B indicates the composition, the crystal structure, the average particle diameter, and the specific surface area of the obtained active material, the combustible substance content, the amount of fluorine component (recovery rate), and the discharge capacities at 0.2 C and 5 C measured by charge/discharge test of a coin battery using the active material as a positive electrode active material.

The crystal structure observed was of R3-m. The discharge capacities at 0.2 C and 5 C were higher than in Comparative Example 5-1.

Example 5-2

$LiNO_3$ Activation Agent

As conditions for the evaporation separation step, heating was performed at 700° C. for 1 hour and the other conditions were made the same as those in Example 5-1 to recover an active material from the electrode material mixture. The treatment conditions are indicated in Table 5-A.

Table 5-B indicates the composition, the crystal structure, the average particle diameter, and the specific surface area of the obtained active material, the combustible substance content, the amount of fluorine component (recovery rate), and the discharge capacities at 0.2 C and 5 C measured by charge/discharge test of a coin battery using the active material as a positive electrode active material.

The crystal structure observed was of R3-m, and the discharge capacities at 0.2 C and 5 C were higher than in Comparative Example 5-1.

TABLE 5-A

Treatment Conditions for Recovery of Active Material from Positive Electrode Using Evaporation Separation Method in Active Material Recovery Step

| | Activation agent (*Amount of addition) | pH of activation agent | Melting point of activation agent | Retention temperature/ retention time | Temperature/ time of evaporation separation step |
|---|---|---|---|---|---|
| Comp. Ex. 5-1 | None | — | — | 400° C./4 H | 900° C./1 H |

TABLE 5-A-continued

Treatment Conditions for Recovery of Active Material from Positive Electrode Using Evaporation Separation Method in Active Material Recovery Step

| | Activation agent (*Amount of addition) | pH of activation agent | Melting point of activation agent | Retention temperature/ retention time | Temperature/ time of evaporation separation step |
|---|---|---|---|---|---|
| Ex. 5-1 | LiNO$_3$ (0.1 mol) | 5.8 | 261° C. | 400° C./4 H | 900° C./1 H |
| Ex. 5-2 | LiNO$_3$ (0.2 mol) | 5.8 | 261° C. | 400° C./4 H | 700° C./1 H |

*The amounts in parentheses each represent the amount of addition of the activation agent with respect to 1 mol of the positive electrode material constituting the electrode material mixture.

TABLE 5-B

Powder Properties and Battery Characteristics of Active Material Recovered from Waste Electrode (Evaporation Separation Method)

| | Composition | Crystal structure | Average particle diameter [nm] | Specific surface area [m$^2$/g] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|---|
| Untreated positive electrode material | Li$_{1.07}$Ni$_{0.47}$Mn$_{0.48}$Fe$_{0.05}$O$_2$ | R-3m | 200 | 10 | — | — | 138 | 106 |
| Comp. Ex. 5-1 | Li$_{1.09}$Ni$_{0.47}$Mn$_{0.48}$Fe$_{0.05}$O$_2$ | R-3m | 200 | 1.9 | 1.5 | — | 25 | 3 |
| Ex. 5-1 | Li$_{1.20}$Ni$_{0.47}$Mn$_{0.48}$Fe$_{0.05}$O$_2$ | R-3m | 200 | 0.8 | 0.1 | 42 (71%) | 70 | 17 |
| Ex. 5-2 | Li$_{1.35}$Ni$_{0.47}$Mn$_{0.48}$Fe$_{0.05}$O$_2$ | R-3m | 200 | 5.5 | 0.8 | 37 (62%) | 116 | 73 |

VI. Recovery of LiCoO$_2$ Active Material from Positive Electrode Recovered from Used Battery An used battery was obtained by repeating the charge/discharge cycle of a battery using LiCoO$_2$ as an active material. The used battery was disassembled to take out a positive electrode. The positive electrode taken out from the used battery was used as a waste battery material to recover the LiCoO$_2$ active material from the positive electrode.

"Structure of Positive Electrode Recovered from Used Battery Using LiCoO$_2$ as Active Material"

The structure of the positive electrode recovered from the used battery using LiCoO$_2$ as the active material was as follows. The electrode included an electrode material mixture laminated on aluminium foil 1085 (manufactured by Nippon Foil Mfg. Co. Ltd.) for a positive electrode current collector. The electrode material mixture was composed of an active material, a conductive material, a binder, and a thickener as below.

The active material constituting the electrode material mixture was a positive electrode active material as an unused active material, in which the composition measured by ICP atomic emission analysis was LiCoO$_2$; the crystal structure measured by X-ray powder diffraction measurement was of R-3m; the BET specific surface area was 0.2 m$^2$/g; and the average primary particle diameter measured from an image obtained by SEM observation was 10 μm. In the charge/discharge test of a coin battery using the active material (the unused active material) as a positive electrode active material, the discharge capacities of the active material measured at 0.2 C and at 5 C, respectively, were 150 mAh/g and 101 mAh/g, respectively. In the positive electrode recovered from the used battery, the discharge capacity of the active material at 5 C was lower than in the unused active material.

As the conductive material constituting the electrode recovered from the used battery using LiCoO$_2$ as the active material, acetylene black HS100 (DENKA BLACK manufactured by Denki Kagaku Kogyo K.K) was used. The BET specific surface area of the acetylene black was 40 m$^2$/g and the average primary particle diameter thereof was 50 nm.

The binder used was PTFE.

The thickener used was CMC.

Regarding the constitutional ratio of the electrode material mixture, a weight ratio of the active material:the conductive material:the binder:the thickener was 92:2.7:4.55:0.75, respectively.

<Recovery of Active Material from Waste Electrode Material>

Using the positive electrode recovered from the used battery described above, the recovery of an active material was performed by Examples and Comparative Examples below.

Comparative Example 6-1

No Use of Activation Agent

Two g of the electrode material mixture taken out from the used battery using LiCoO$_2$ as the active material was heated at the retention temperature of 700° C. for the treatment time of 4 hours without mixing any activation agent therein, and the other conditions were made the same as those in Comparative Example 1-1 to obtain a recovered product. The treatment conditions are indicated in Table 6-A.

Table 6-B indicates the crystal structure, the average particle diameter, and the specific surface area of the recovered product, the combustible substance content, and the discharge capacities at 0.2 C and 5 C measured by charge/discharge test of a coin battery using the recovered product as a positive electrode active material.

In the X-ray powder diffraction measurement of the recovered product, there was observed, in addition to an R3-m crystal structure, a crystal structure corresponding to Co$_3$O$_4$. The discharge capacity at 0.2 C was low.

Example 6-1

Li$_2$CO$_3$/Na$_2$SO$_4$ Activation Agent

In 2 g of the same electrode material mixture as in Comparative Example 6-1 was mixed an activation agent including Li$_2$CO$_3$ and Na$_2$SO$_4$ in amounts of 0.1 mol and 0.1 mol, respectively, with respect to 1 mol of the positive electrode active material in the electrode material mixture to produce a pre-activation mixture. The mixture was subject to activation at the retention temperature of 700° C. for the retention temperature of 4 hours and the other conditions were made the same as those in Example 1-1 to obtain an active material. The treatment conditions are indicated in Table 6-A.

Table 6-B indicates the composition, the crystal structure, the average particle diameter, and the specific surface area of the obtained active material, the amount of recovered fluorine (recovery rate), and the discharge capacities at 0.2 C and 5 C measured by charge/discharge test of a coin battery using the active material as a positive electrode active material.

In the X-ray powder diffraction measurement of the recovered product, there was observed, in addition to a R3-m crystal structure, a crystal structure corresponding to CoO. The discharge capacities at 0.2 C and 5 C were higher than in Comparative Example 6-1.

Fluorine ion included in a filtrate separated from the active material in the solid-liquid separation step was measured, whereby the recovery of 34 mg of fluorine in the aqueous solution was observed. This was equivalent to 49% of a fluorine component contained in the electrode material mixture before treatment.

TABLE 6-A

Treatment Conditions for Recovery of $LiCoO_2$ Active Material Recovered from Positive Electrode Recovered from Used Battery

| | Activation agent (*Amount of addition) | pH of activation agent | Melting point of activation agent | Retention temperature/ retention time |
|---|---|---|---|---|
| Untreated positive electrode | — | — | — | — |
| Comp. Ex. 6-1 | None | — | — | 700° C./4 H |
| Ex. 6-1 | $Li_2CO_3$ (0.1 mol) $Na_2SO_4$ (0.1 mol) | 11.6 | 510° C. | 700° C./4 H |

*The amount in each parenthesis means the amount of addition of the activation agent with respect to 1 mol of the positive electrode material constituting the electrode material mixture.

VII. Recovery of Active Material $LiNi_{1/3}Co_{1/3}Mn_{1/3}O_2$ from Positive Electrode <Production of Positive Electrode Including $LiNi_{1/3}Co_{1/3}Mn_{1/3}O_2$ as Active Material>

Using DISPERMAT (manufactured by Vam-Geztmann GmbH), 135 g of an active material, 7.5 g of a conductive material, 7.5 g of a binder, and 150 g of a solvent were mixed together to produce a positive electrode material mixture paste.

The active material used was a positive electrode active material in which the composition measured by ICP atomic emission analysis was $LiNi_{1/3}Co_{1/3}Mn_{1/3}O_2$; the crystal structure measured by X-ray powder diffraction measurement was of R-3 m; the BET specific surface area was 0.4 $m^2/g$; and the average primary particle diameter measured from an image obtained by SEM observation was 8 μm. In the charge/discharge test of a coin battery using the active material (the unused active material) as a positive electrode active material, the discharge capacities measured at 0.2 C and 5 C, respectively, were 154 mAh/g and 130 mAh/g, respectively.

The conductive material used was acetylene black HS100 (manufactured by Denki Kagaku Kogyo K.K). The BET specific surface area of the acetylene black was 40 $m^2/g$ and the average primary particle diameter thereof measured from the image of SEM observation was 50 nm.

Regarding the binder and the solvent, an additional NMP solvent was further added into an NMP solution containing 5% by weight of PVdF #7300 (manufactured by Kureha Corporation) as a binder to adjust to the predetermined ratio.

The positive electrode material mixture paste was coated on aluminium foil 1085 with the thickness of 20 μm (manufactured by Nippon Foil Mfg. Co. Ltd.) for a positive electrode current collector of lithium ion secondary battery, using a coater for secondary battery, and then dried to obtain an electrode. The amount of the electrode material mixture on the aluminium foil was 15 $mg/cm^2$.

<Recovery of Active Material from Waste Electrode Material>

Using the positive electrode produced above, the recovery of an active material was performed by Examples and Comparative Examples below.

TABLE 6-B

Powder Properties and Battery characteristics of $LiCoO_2$ Active Material Recovered from Positive Electrode Recovered from Used Battery

| | Crystal structure | Average particle diameter | Specific surface area [$m^2/g$] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|
| Untreated positive electrode material | R-3m | 10 μm | 0.2 | — | — | 150 | 101 |
| Electrode taken out from use battery | R-3m | — | — | — | — | 149 | 5 |
| Comp. Ex. 6-1 | R-3m $Co_3O_4$ | 10 μm | 0.3 | 0 | — | 114 | 75 |
| Ex. 6-1 | R-3m CoO | 10 μm | 1.0 | 0 | 34 (49%) | 143 | 117 |

Comparative Example 7-1

No Use of Activation Agent

An electrode material mixture was mechanically peeled from the positive electrode using $LiNi_{1/3}Co_{1/3}Mn_{1/3}O_2$ as the active material described above. Then, 2 g of the electrode material mixture was heated at the retention temperature of 700° C. for the retention time of 4 hours without mixing any activation agent therein, and the other conditions were made the same as those in Comparative Example 1-1 to obtain a recovered product. The treatment conditions are indicated in Table 7-A.

Table 7-B indicates the crystal structure, the average particle diameter, and the specific surface area of the recovered product, the combustible substance content, and the discharge capacities at 0.2 C and 5 C measured by charge/discharge test of a coin battery using the recovered product as a positive electrode active material.

The recovered product had an R3-m crystal structure. The discharge capacities at 0.2 C and 5 C were low.

Example 7-1

$Li_2CO_3/Na_2SO_4$ Activation Agent

In 2 g of an electrode material mixture recovered from the same positive electrode using the $LiNi_{1/3}Co_{1/3}Mn_{1/3}O_2$ active material as in Comparative Example 7-1 was mixed an activation agent including $Li_2CO_3$ and $Na_2SO_4$ in amounts of 0.1 mol and 0.1 mol, respectively, with respect to 1 mol of the positive electrode active material in the electrode material mixture to produce a pre-activation mixture. The mixture product was subjected to activation at the retention temperature of 700° C. for the retention time of 4 hours and the other conditions were made the same as those in Example 1-1 to obtain an active material. The treatment conditions are indicated in Table 7-A.

Table 7-B indicates the crystal structure, the average particle diameter, and the specific surface area of the obtained active material, the combustible substance content, the amount of recovered fluorine (recovery rate), and the discharge capacities at 0.2 C and 5 C measured by charge/discharge test of a coin battery using the active material as a positive electrode active material.

The crystal structure of the active material was of R3-m. The discharge capacities at 0.2 C and 5 C were higher than those in Comparative Example 7-1, and the discharge capacity at 0.2 C was approximately the same as in the unused active material.

TABLE 7-A

Treatment Conditions for Recovery of Active Material $LiNi_{1/3}Co_{1/3}Mn_{1/3}O_2$ from Positive Electrode
(Solid-Liquid Separation of Slurry)

| | Activation agent (*Amount of addition) | pH of activation agent | Melting point of activation agent | Retention temperature/ retention time |
|---|---|---|---|---|
| Untreated positive electrode | | — | — | — |
| Comp. Ex. 7-1 | None | — | — | 700° C./4 H |
| Ex. 7-1 | $Li_2CO_3$ (0.1 mol) $Na_2SO_4$ (0.1 mol) | 11.5 | 510° C. | 700° C./4 H |

*The amounts in parentheses each represent the amount of addition of activation agent with respect to 1 mol of positive electrode material constituting electrode material mixture.

TABLE 7-B

Powder Properties and Battery characteristics of Active Material $LiNi_{1/3}Co_{1/3}M.n_{1/3}O_2$ Recovered from Positive Electrode (Solid-Liquid Separation of Slurry)

| | Crystal structure | Average particle diameter | Specific surface area [m²/g] | Combustible substance content [wt %] | Amount of recovered fluorine [mg] (recovery rate) | Discharge capacity at 0.2 C [mAh/g] | Discharge capacity at 5 C [mAh/g] |
|---|---|---|---|---|---|---|---|
| Untreated positive electrode material | R-3m | 8 μm | 0.37 | | | 154 | 130 |
| Comp. Ex. 7-1 | R-3m | 8 μm | 0.44 | 1.5 | | 137 | 90 |
| Ex. 7-1 | R-3m | 8 μm | 1.60 | 0 | 50 (84%) | 155 | 116 |

INDUSTRIAL APPLICABILITY

According to the method of the present invention, an active material can be directly recovered from a waste battery material, without requiring manufacturing cost and manufacturing energy necessary to produce the active material from a raw material of the active material and without using an organic solvent to recover the active material from the waste battery material. Therefore, the method of the invention is industrially advantageous.

The invention claimed is:

1. A method for producing an active material comprising an alkali metal element by recovering the active material from a waste battery material, the method comprising:
   (1) an electrode material mixture recovery step of separating an electrode from the waste battery material of a secondary battery to recover an electrode material mixture including the active material, a conductive material, and a binder from the electrode;
   (2) an activation agent mixing step of mixing an activation agent including one or more alkali metal compounds with the recovered electrode material mixture, wherein an alkali metal element constituting the alkali metal compound included in the activation agent is the same as an alkali metal element constituting the active material;

(3) an activation step of heating a mixture obtained in step (2) to a retention temperature not less than a melting start temperature of the activation agent to activate the active material included in the mixture; and (4) an active material recovery step of recovering the activated active material from a mixture obtained as a result of cooling without decomposing into a raw material compound of the active material including a constituent element thereof after the activation step.

2. The method according to claim 1, wherein the active material is a positive electrode active material.

3. The method according to claim 2, wherein the positive electrode active material is a positive electrode active material of a non-aqueous secondary battery.

4. The method according to claim 2, wherein the active material is a composite oxide including one or more elements selected from the following element group 1 and one or more elements selected from the following element group 2:
element group 1: Ni, Co, Mn, Fe, Al, and P; and
element group 2: Li, Na, Ca, Sr, Ba, and Mg.

5. The method according to claim 4, wherein the element selected from the element group 2 is Li.

6. The method according to claim 2, wherein the positive electrode active material has a specific surface area of from 5 to 100m$^2$/g.

7. The method according to claim 1, wherein at least one of the alkali metal compounds included in the activation agent is an alkali metal compound exhibiting alkaline properties when dissolved in water.

8. The method according to claim 7, wherein the alkali metal compound exhibiting alkaline properties when dissolved in water is at least one selected from the group consisting of hydroxide, carbonate, hydrogen carbonate, oxide, peroxide, and superoxide of alkali metal.

9. The method according to claim 1, wherein the conductive material included in the electrode material mixture is a carbonaceous conductive material and at least one of the alkali metal compounds included in the activation agent is an alkali metal compound having oxidizability to oxidize and decompose the carbonaceous conductive material at a retention temperature of the activation step.

10. The method according to claim 9, wherein the alkali metal compound having oxidizability is at least one selected from the group consisting of peroxide, superoxide, nitrate, sulfate, vanadate, and molybdate of alkali metal.

11. The method according to claim 1, wherein in the activation agent mixing step, an addition amount of the activation agent is from 0.001 to 100 times a weight of the active material before activation included in the electrode material mixture.

12. The method according to claim 1, wherein the conductive material included in the electrode material mixture consists of a carbonaceous conductive material having a specific surface area of 30 m$^2$/g or more.

13. The method according to claim 12, wherein the carbonaceous conductive material is acetylene black.

14. The method according to claim 1, wherein the active material recovery step comprises:
a slurrying step of adding a solvent to a mixture obtained after the activation step to form a slurry;
a solid-liquid separation step of separating the slurry into a solid phase and a liquid phase; and
a drying step of drying the solid phase after the solid-liquid separation.

15. The method according to claim 14, further comprising a step of recovering a fluorine component from the liquid phase obtained after the solid-liquid separation.

16. The method according to claim 14, further comprising a step of recovering an alkali metal component from the liquid phase obtained after the solid-liquid separation.

17. The method according to claim 1, wherein the active material recovery step is a step of recovering an active material by evaporating other components than the active material by heating to remove the other components than the active material from a mixture obtained after the activation step.

18. The method according to claim 17, wherein in the active material recovery step, a temperature for evaporating the other components than the active material is higher than a retention temperature in the activation step.

19. The method according to claim 17, further comprising a step of recovering a fluorine component from a solution prepared by adding a solvent to a component obtained by cooling a gas generated by the evaporation of the other components than the active material.

20. The method according to claim 19, further comprising a step of recovering an alkali metal component from the solution after recovering the fluorine component.

* * * * *